(12) United States Patent
Koga et al.

(10) Patent No.: US 7,946,953 B2
(45) Date of Patent: May 24, 2011

(54) DUAL CLUTCH TRANSMISSION

(75) Inventors: Kazunari Koga, Amagasaki (JP);
Tomoyuki Ebihara, Amagasaki (JP);
Norihiro Ishii, Amagasaki (JP); Kengo Sasahara, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 399 days.

(21) Appl. No.: 12/252,116

(22) Filed: Oct. 15, 2008

(65) Prior Publication Data
US 2009/0095102 A1   Apr. 16, 2009

(30) Foreign Application Priority Data
Oct. 15, 2007   (JP) ................................. 2007-268315

(51) Int. Cl.
*F16H 59/00* (2006.01)
*B60W 10/00* (2006.01)

(52) U.S. Cl. ........................................ 477/78; 74/336 R

(58) Field of Classification Search .................... 74/331, 74/336 R
See application file for complete search history.

(56) References Cited

U.S. PATENT DOCUMENTS

| | | | | |
|---|---|---|---|---|
| 5,819,191 | A * | 10/1998 | Stasik et al. ..................... | 701/52 |
| 6,209,406 | B1 * | 4/2001 | Sperber et al. ................... | 74/330 |
| 6,427,550 | B1 * | 8/2002 | Bowen ......................... | 74/336 R |
| 6,463,821 | B1 * | 10/2002 | Reed et al. ...................... | 74/330 |
| 6,679,134 | B2 * | 1/2004 | Shigyo ........................ | 74/336 R |
| 7,090,617 | B2 * | 8/2006 | Bassler ......................... | 477/180 |
| 7,127,961 | B2 * | 10/2006 | Braford et al. .................. | 74/340 |
| 7,276,016 | B2 * | 10/2007 | Ishii et al. ...................... | 477/115 |
| 7,601,095 | B2 * | 10/2009 | Hasegawa et al. ............. | 477/180 |
| 7,630,811 | B2 * | 12/2009 | Jiang .............................. | 701/54 |
| 7,740,558 | B2 * | 6/2010 | Matsumura et al. ............ | 477/79 |
| 2009/0165584 | A1 * | 7/2009 | Ishii ............................. | 74/336 R |

FOREIGN PATENT DOCUMENTS

JP   10-318361   12/1998

* cited by examiner

*Primary Examiner* — Dirk Wright
(74) *Attorney, Agent, or Firm* — Sterne, Kessler, Goldstein & Fox P.L.L.C.

(57) ABSTRACT

A dual clutch transmission includes a group of odd-numbered speed drive trains, including at least a first speed drive train to be driven for setting a first speed serving as the lowest speed; a first clutch to be engaged for driving any one of the odd-numbered speed drive trains including the first speed drive train; a group of even-numbered speed drive trains, including at least a second speed drive train to be driven for setting a second speed serving as the second lowest speed; a second clutch to be engaged for driving any one of the even-numbered speed drive trains including the second speed drive train; an automatic speed control system for selecting one of all the odd-and-even numbered speed drive trains to be driven, and for selecting either the first or second clutch to be engaged for driving the selected speed drive train in correspondence to a traveling speed of a vehicle equipped with the dual clutch transmission; and a manual selection device for selecting any one of all the odd-and-even numbered speed drive trains, including the second speed drive train and excluding the first speed drive train, as a starting-and-stopping speed drive train to be driven when the vehicle starts and immediately before the vehicle stops.

5 Claims, 27 Drawing Sheets

DUAL CLUTCH TRANSMISSION

BACKGROUND OF THE INVENTION

1. Field of the Invention

The present invention relates to a dual clutch transmission for a vehicle. The dual clutch transmission comprises: a group of odd-numbered speed drive trains, including at least a first speed drive train to be driven for setting a first speed serving as the lowest speed; a first clutch to be engaged for driving any one of the odd-numbered speed drive trains; a group of even-numbered speed drive trains, including at least a second speed drive train to be driven for setting a second speed serving as the second lowest speed; and a second clutch to be engaged for driving any one of the even-numbered speed drive trains.

2. Related Art

As disclosed in Japanese Laid-Open Gazette No. H10-318361, there exists a well-known and conventional dual clutch transmission. The dual clutch transmission comprises an automatic speed control system for selecting one of all the odd-and-even numbered speed drive trains to be driven, and for selecting either the first or second clutch to be engaged for driving the selected speed drive train, in correspondence to at least an actual traveling speed of a vehicle equipped with the dual clutch transmission. Therefore, the automatic speed control system ensures an appropriate speed change of the dual clutch transmission so as to prevent unexpectedly sudden speed change of the vehicle, overloading or stopping of an engine, waste energy consumption and so on.

With regard to the above conventional dual clutch transmission, the first speed, i.e., the lowest speed, must be selected when a vehicle starts or immediately before the vehicle stops. However, in many cases, the first speed is selected in a moment. It results in that the automatic control system performs inefficiently selection of the first speed drive train to be driven and insufficient selection of the first clutch to be engaged. If another speed drive train ensures power enough for starting and stopping of the vehicle, this speed drive train is suggested to be used for these cases.

SUMMARY OF THE INVENTION

An object of the invention is to provide a dual clutch transmission which can efficiently operate its clutches in consideration of a vehicle on starting and immediately before stopping.

To attain this object, a dual clutch transmission according to the invention comprises: at least one drive train of odd-numbered speed, including at least a drive train of a first speed serving as the lowest speed; a first clutch to be engaged for driving the drive train of the first speed or another odd-numbered speed; at least one drive train of even-numbered speed, including at least a drive train of a second speed serving as the second lowest speed; a second clutch to be engaged for driving the drive train of the second speed or another even-numbered speed; an automatic speed control system for selecting one of the drive trains, and for selecting either the first or second clutch to be engaged for driving the selected drive train, in correspondence to at least an actual traveling speed of a vehicle equipped with the dual clutch transmission; and a selection means for selecting either the first speed or any speed other than the first speed to be selected for starting and stopping of the vehicle.

Due to the selection means, when any speed other than the first speed is selected for starting and stopping of the vehicle, a waste clutch shift for starting or stopping the vehicle can be reduced so as to ensure an efficient speed change of the dual clutch transmission and to improve the feeling of speed change of the vehicle equipped with the dual clutch transmission. For example, it is assumed that the drive train of the second speed is selected for starting and stopping of the vehicle. The vehicle stops while setting the second speed, and then, the vehicle starts at the second speed without speed change to the first speed. Accordingly, when the vehicle starts or immediately before the vehicle stops, the clutch state of the first and second clutches for setting the second speed, where the first clutch is disengaged and the second clutch is engaged, does not have to be changed to a different clutch state for setting the first speed where the first clutch is engaged and the second clutch is disengaged.

Preferably, a load on an engine of the vehicle during traveling is detected. When the detected load exceeds a threshold, the selection means automatically selects the first speed to be selected for starting and stopping the vehicle, and otherwise, the selection means automatically selects any other than the first speed to be selected for starting and stopping the vehicle. Therefore, an optimal speed corresponding to the loaded condition of the engine is automatically selected for starting and stopping of the vehicle without requiring an operator's operation. When the engine is overloaded, the vehicle travels with high torque by setting the first speed on its starting and immediately before its stopping, thereby avoiding problems such as engine stalling. When the load on the engine is allowable, the vehicle travels by setting any speed other than the first speed on its starting and immediately before its stopping, thereby enhancing energy consumption efficiency.

Further, preferably, the load on the engine of the vehicle during traveling is defined as a relation of a detection value of engine rotary speed to a detection value of accelerator position. Therefore, existing simple sensors, i.e., an accelerator position sensor (e.g., an accelerator pedal position sensor) and an engine rotary speed sensor, can be utilized so as to require no additional complicated and expensive torque sensor.

Preferably, a tilt angle of the vehicle is detected. When the detected tilt angle exceeds a threshold, the selection means automatically selects the first speed to be selected for starting and stopping the vehicle, and otherwise, the selection means automatically selects any other than the first speed to be selected for starting and stopping the vehicle. Therefore, an optimal speed corresponding to the tilt condition of the vehicle is automatically selected for starting and stopping of the vehicle without requiring an operator's operation. When the vehicle is on a steep slope, the vehicle climbs the slope with high torque by setting the first speed on its starting and immediately before its stopping, thereby avoiding problems such as engine stalling. When the vehicle is on a gentle slope or on a flat road, the vehicle travels by setting any speed other than the first speed on its starting and immediately before its stopping, thereby enhancing energy consumption efficiency.

Preferably, the automatic speed control system can skip driving of a drive train or drive trains of one or more speeds when shifting from one speed to another speed. Therefore, the frequency in changing of driving of one drive train to another drive train and interchanging of engagement between the first and second clutches is reduced so as to improve the speed change feeling of the vehicle, to reduce power loss, and to bring other effects.

These, other and further objects, features and advantages of the invention will appear more fully from the following description with reference to accompanying drawings.

DETAILED DESCRIPTION OF THE INVENTION

Figure 1:
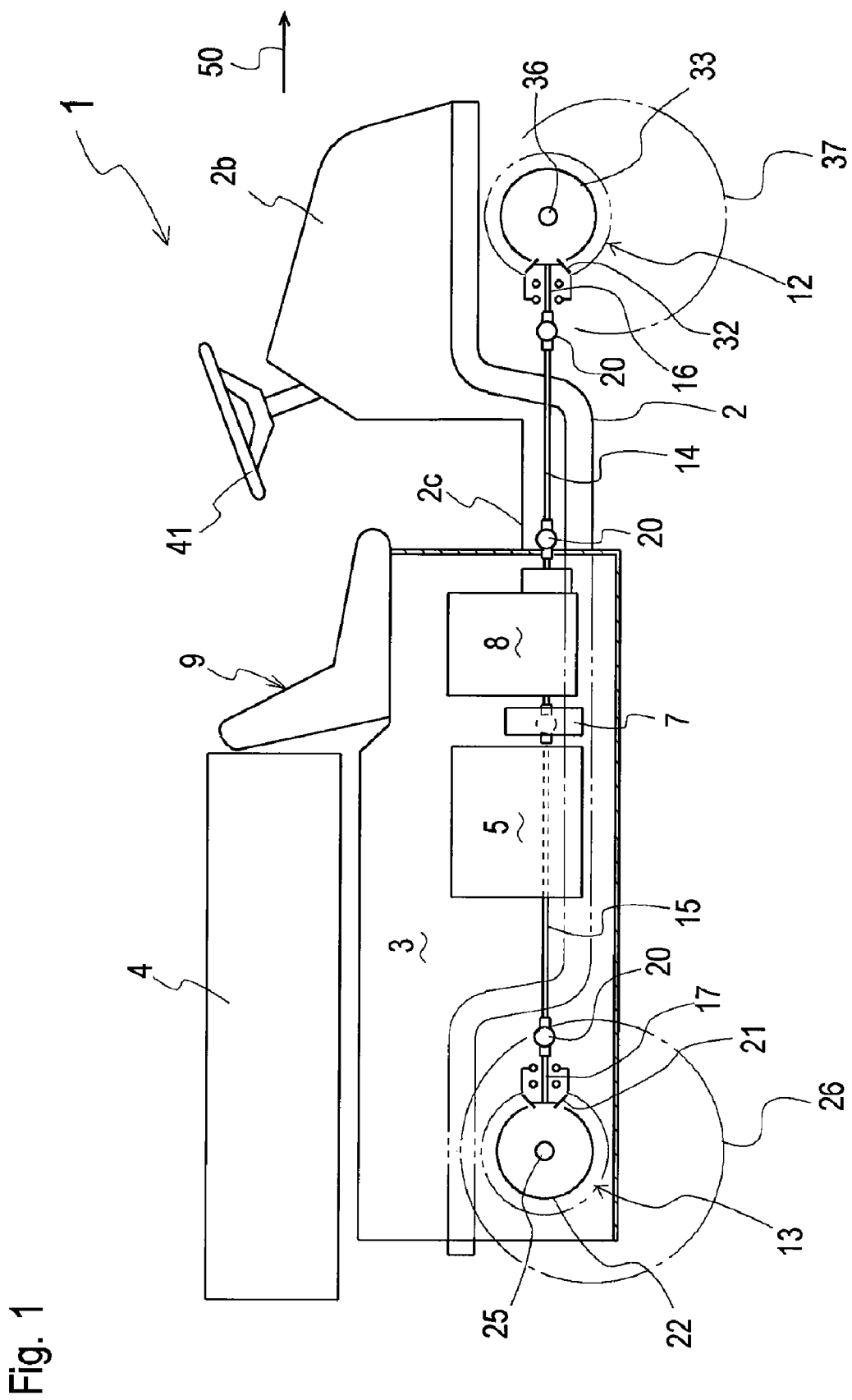
FIG. 1 is a side view of an entire utility vehicle equipped with a transmission casing incorporating a dual clutch transmission according to the present invention.
Figure 2:
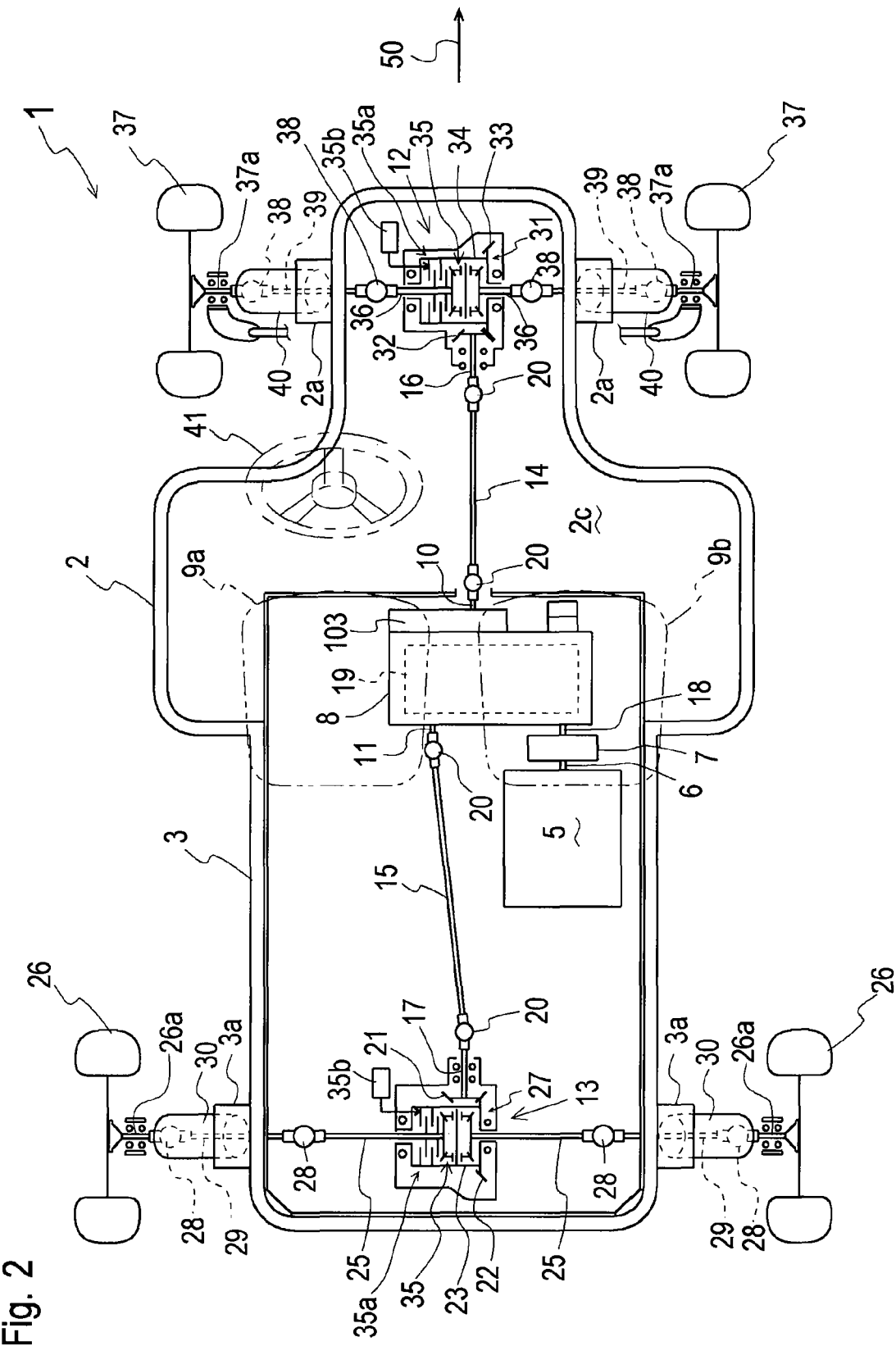
FIG. 2 is a schematic plan view of the utility vehicle.

As shown in FIGS. 1 and 2, a dual clutch transmission 19 according to the present invention is disposed in a transmission casing 8 of a utility vehicle 1, for example. Utility vehicle 1 (hereinafter, simply referred to as "vehicle 1") equipped with transmission casing 8 serves as a typical vehicle equipped with a dual clutch transmission. A general entire structure of vehicle 1 will be described with reference to FIGS. 1 and 2, on the assumption that vehicle 1 is directed forward in a direction designated by an arrow 50.

A front frame 2 and a rear frame 3 are connected to each other so as to constitute a main body of vehicle 1. A front cover 2b is disposed on a front portion of front frame 2. An instrument and operation panel is provided on an upper rear end portion of front cover 2b, and is provided thereabove with a steering wheel 41. A horizontal platform 2c is formed on a rear portion of front frame 2 behind a rear end of front cover 2b. A cargo deck 4 is vertically rotatably mounted on the top of rear frame 3. Seats 9, i.e., a driver's seat 9a and an assistant's seat 9b, are mounted on a front portion of rear frame 3, and steering wheel 41 is disposed in front of driver's seat 9a.

Inside of rear frame 3 below seats 9 are disposed an engine 5 having a fore-and-aft horizontal crankshaft (not shown), and transmission casing 8 in front of engine 5. An input shaft 18 projects rearward from a rightward rear end of transmission casing 8, and an output shaft 6 projects forward from engine 5 to be substantially coaxially connected to input shaft 18 through a flywheel 7.

A front output shaft 10 projects forward from a lateral middle portion of a front end of transmission casing 8 incorporating dual clutch transmission 19. A rear output shaft 11 projects a leftward rear end of transmission casing 8. Dual clutch transmission 19 in transmission casing 8 speed-changes the rotary force of input shaft 18 driven by engine 5 and distributes its output between front output shaft 10 and rear output shaft 11. When vehicle 1 travels backward, the rotation direction of front and rear output shafts 10 and 11 is reversed.

A rear transaxle 13 is disposed behind transmission casing 8. An input shaft projects forward from a front surface of rear transaxle 13 and is connected to rear output shaft 11 through a propeller shaft 15 and joints 20. Rear output shaft 11 projects rearward from the leftward rear end of transmission casing 8 laterally opposite to engine 5 and input shaft 18, so that propeller shaft 15 among other members interposed rear output shaft 11 and input shaft 17 is laterally offset from engine 5.

On the other hand, a front transaxle 12 having rearwardly projecting input shaft 16 is disposed in front of transmission casing 8. Input shaft 16 is connected to front output shaft 10 projecting from transmission casing 8 through a propeller shaft 14 and joints 20. Preferably, joints 20 are universal joints. Alternatively, in the case that input shaft 16 and front output shaft 10 are substantially coaxial to each other, simple and inexpensive sleeve-shaped couplers may serve as joint 20 connecting shafts 16 and 10 to each other.

Rear transaxle 13 supporting right and left rear axles 25 is vibro-isolatedly supported onto a laterally middle rear under portion of rear frame 3 and incorporates a rear differential unit 27 through which right and left rear axles 25 are differentially connected to each other. Rear differential unit 27 includes a differential cage 23. A bevel input gear 22 of rear differential unit 27 is fixed on differential cage 23 and meshes with a bevel gear 21 fixed on input shaft 17 in rear transaxle 13. Rear differential unit 27 includes a differential bevel gear mechanism 35 in differential cage 23. Differential bevel gear mechanism 35 is interposed between differential cage 23 and proximal ends of right and left axles 25. Right and left rear wheels 26 are disposed outside of right and left ends of a rear portion of rear frame 3, and are drivingly connected at respective center axis shafts 26a to respective axles 25 through respective universal joints 28 and respective propeller shafts 29.

Bevel differential gear mechanism 35 evenly distributes the rotary force of differential cage 23 between right and left rear axles 25 when right and left rear wheels 26 are evenly loaded by a ground. Bevel differential gear mechanism 35 differentially drives right and left rear axles 25 in correspondence to a differential load by the ground between right and left rear wheels 26. Bevel differential gear mechanism 35 is provided with a limited slip differential (LSD) mechanism 35a which restricts the differential rotation of right and left axles 25 by transmitting the rotary force of one more loaded axle 25 to the other less loaded axle 25 when the differential ground load on axles 25 exceeds a threshold, thereby improving the right and left turning performance of right and left rear wheels 26 and the traction of rear wheels 26 in various ground conditions. More specifically, LSD mechanism 35a includes friction discs. The friction discs relatively unrotatably fitted to one axle 25 and the friction discs relatively unrotatably fitted to differential cage 23 are alternately aligned and are pressed against one another. An electric actuator 35b creates a frictional pressure among the friction discs of LSD mechanism 35a in correspondence to the differential load between right and left rear wheels 26.

Right and left stays 3a are formed on the respective right and left ends of the rear portion of rear frame 3, and each of suspensions 30 such as coiled springs or shock absorbers is interposed between each stay 3a and center axial shaft 26a of each rear wheel 26. In this way, rear wheels 26 are drive wheels driven by engine 5, and may be steerable wheels steerably attached to right and left ends of rear frame 3.

Front transaxle 12 supporting right and left front axles 36 is vibro-isolatedly supported to a substantially laterally middle front under portion of front frame 2, and incorporates a front differential unit 31 differentially connecting right and left front axles 36 to each other. Similarly to rear differential unit 27, a bevel input gear 33 fixed on a differential cage 34 of front differential unit 31 meshes with a bevel gear 32 fixed on input shaft 16, so that front differential unit 31 is drivingly connected to input shaft 16, and includes a differential bevel gear mechanism 35 provided with an LSD mechanism 35a and an electric actuator 35b for controlling a friction pressure of LSD mechanism 35a.

Right and left steerable front wheels 37 are flexibly and drivingly connected at respective center axial shafts 37a to respective right and left front axles 36 through respective universal joints 38 and respective propeller shafts 39. A suspension 40 is interposed between center axial shaft 37a of each front wheel 37 and a stay 2a formed on each of right and left ends of front frame 2.

Figure 3:
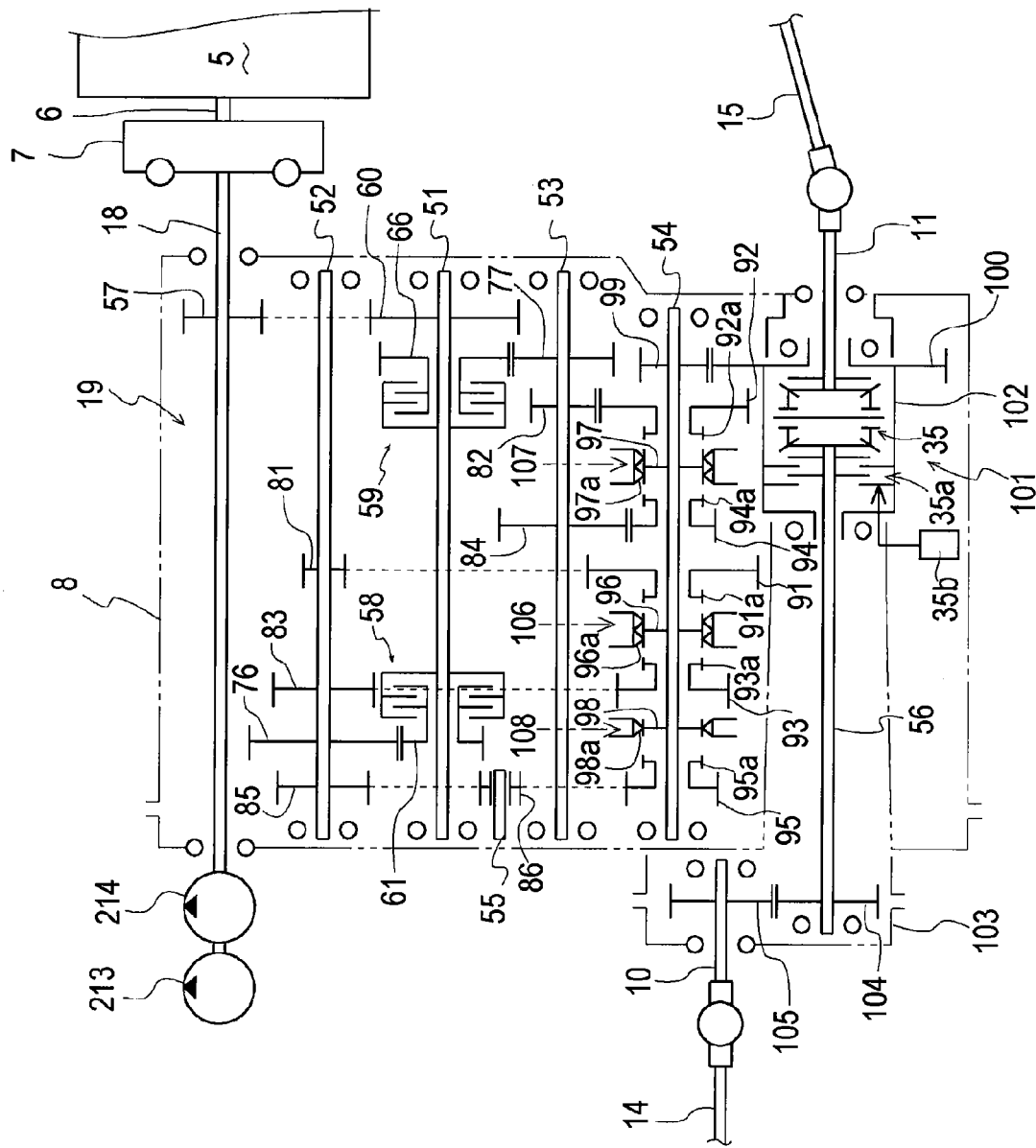
FIG. 3 is a skeleton diagram of a power transmission system including the dual clutch transmission in the transmission casing.
Figure 4:
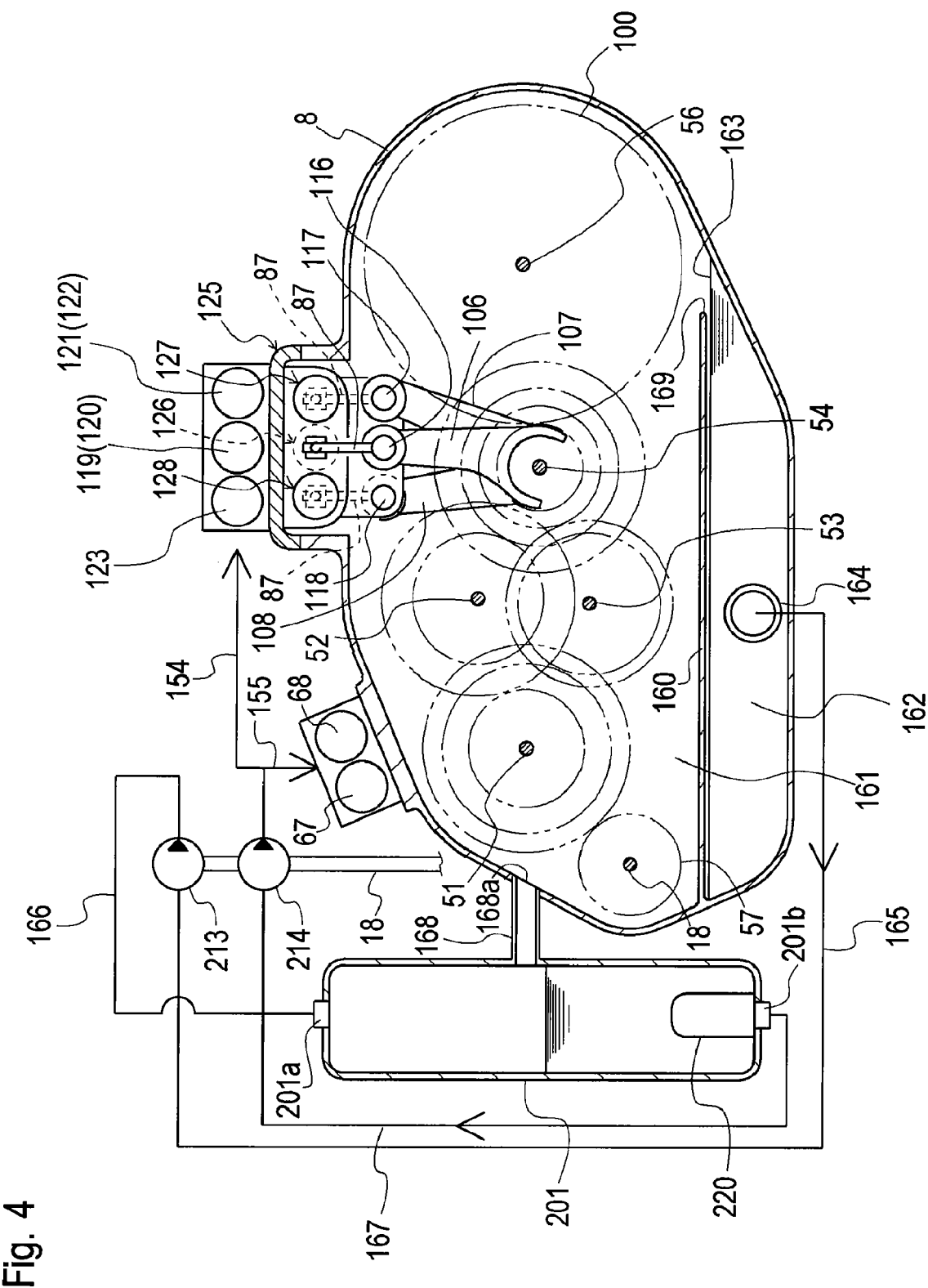
FIG. 4 is a schematic sectional front view of the transmission casing incorporating the dual clutch transmission.

As shown in FIGS. 3 and 4, transmission casing 8 incorporates dual clutch transmission 19 and a center differential unit 101 driven by dual clutch transmission 19. Input shaft 18, a clutch input shaft 51, a first speed-change shaft 52, a second speed-change shaft 53, a speed-change output shaft 54 and a reversing counter shaft 55 are fore-and-aft horizontally extended in parallel in transmission casing 8 so as to serve as rotary shafts of dual clutch transmission 19.

Center differential unit 101 includes a differential cage 102 and an input gear 100 fixed on differential cage 102. Input gear 100 meshes with a transmission output gear 99 fixed on transmission output shaft 54 of dual clutch transmission 19 so as to receive the output of dual clutch transmission 19. A front output shaft 56 and rear output shaft 11 are fore-and-aft horizontally extended coaxially to each other in transmission casing 8. Similar to front and rear differential units 31 and 27, center differential unit 101 includes a differential bevel gear mechanism 35 in differential cage 102 so as to differentially connect front output shaft 56 and rear output shaft 11 to each other, and differential bevel gear mechanism 35 is provided with an LSD mechanism 35a.

As shown in FIG. 2, a gear casing 103 is fixed on a leftward front end of transmission casing 8. As shown in FIG. 3, in gear casing 103, a gear 104 is fixed on a front end of front output shaft 56, a gear 105 is fixed on a rear end of front output shaft 10, and gears 104 and 105 mesh with each other. Front output shaft 10 projects forward from gear casing 103 so as to be drivingly connected to input shaft 16 of front transaxle 12 as mentioned above. Rear output shaft 11 projects rearward from the rear end of transmission casing 8 so as to be drivingly connected to input shaft 17 of rear transaxle 13 as mentioned above.

Dual clutch transmission 19 will be detailed with reference to FIGS. 3 to 7. A gear 57 fixed on input shaft 18 meshes with a gear 60 fixed on clutch input shaft 51 so as to constantly transmit the rotary force of input shaft 18 to clutch input shaft 51. Clutch input shaft 51 is provided therearound with multi-friction disc type first and second clutches 58 and 59. A first clutch output gear 61 and a second clutch output gear 66 are relatively rotatably fitted on clutch input shaft 51. First clutch 58 is interposed between clutch input shaft 51 and first clutch output gear 61 so that first clutch output gear 61 is relatively unrotatably engaged to clutch input shaft 51 by engaging first clutch 58. Second clutch 59 is interposed between clutch input shaft 51 and second clutch output gear 66 so that second clutch output gear 66 is relatively unrotatably engaged to clutch input shaft 51 by engaging second clutch 59.

Figure 7:
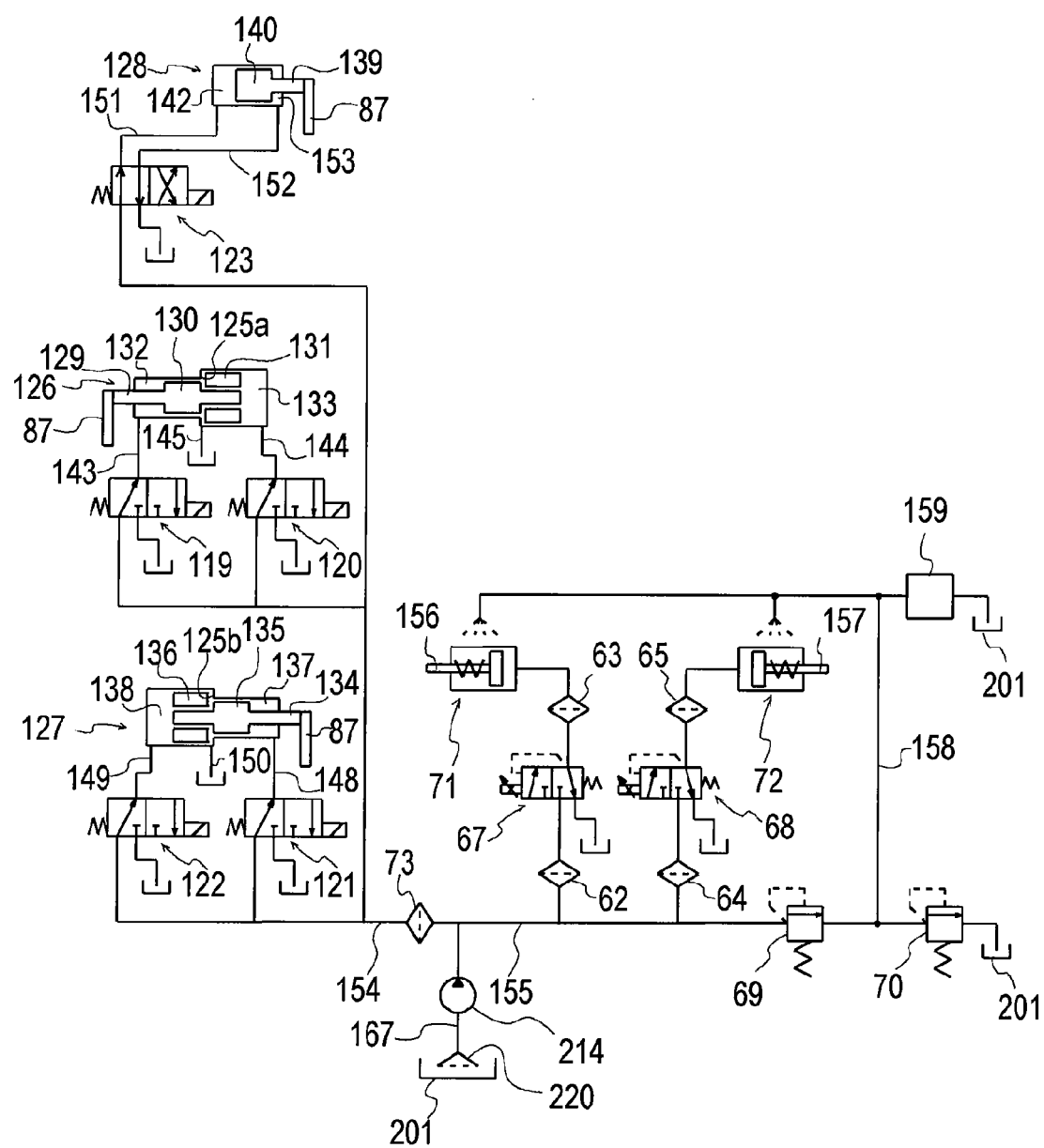
FIG. 7 is a hydraulic circuit diagram of actuators for operating clutches for gearshift of the dual clutch transmission.

As shown in FIG. 7, a clutch actuator chamber is formed on a top portion of transmission casing 8. In the clutch actuator chamber, a hydraulic first clutch cylinder 71 serving as an actuator for controlling first clutch 58 and a hydraulic second clutch cylinder 72 serving as an actuator for controlling second clutch 59 are disposed.

As shown in FIG. 4, first speed-change shaft 52 and second speed-change shaft 53 are aligned up and down between clutch input shaft 51 and speed-change output shaft 54 in transmission casing 8. As shown in FIG. 3, a first speed forward traveling driving gear 81, a third speed forward traveling driving gear 83, an input gear 76 and a backward traveling driving gear 85 are fixed on first speed-change shaft 52. Input gear 76 meshes with first clutch output gear 61 so as to transmit power from clutch input shaft 51 to first speed-change shaft 52 through engaged first clutch 58. A second speed forward traveling driving gear 82, a fourth speed forward traveling driving gear 84 and an input gear 77 are fixed on second speed-change shaft 53. Input gear 77 meshes with second clutch output gear 66 so as to transmit power from clutch input shaft 51 to second speed-change shaft 53 through engaged second clutch 59.

A second speed forward traveling driven gear 92, a fourth speed forward traveling driven gear 94, a first speed forward traveling driven gear 91, a third speed forward traveling driven gear 93 and a backward traveling driven gear 95 are relatively rotatably fitted on speed-change output shaft 54. First speed forward traveling driven gear 91 and third speed forward traveling driven gear 93 mesh with respective driving gears 81 and 83 fixed on first speed-change shaft 52. Second speed forward traveling driven gear 92 and fourth speed forward traveling driven gear 94 mesh with respective driving gears 82 and 84 fixed on second speed-change shaft 53. Backward traveling driven gear 95 meshes with driving gear 85 fixed on first speed-change shaft 52 through an idle gear 86 provided on reversing counter shaft 55.

In this way, in dual clutch transmission 19, gears 81 and 91 serve as a first speed forward traveling gear train. Gears 83 and 93 serve as a third speed forward traveling gear train. A group of the odd-numbered speed forward traveling drive trains, i.e., the first speed forward traveling gear train and the third speed forward traveling gear train, are disposed downstream of first clutch 58. Gears 85, 86 and 95 serve as a backward traveling gear train which is disposed together with the group of odd-numbered speed drive trains downstream of first clutch 58. Gears 82 and 92 serve as a second speed forward traveling gear train. Gears 84 and 94 serve as a fourth speed forward traveling gear train. A group of the even-numbered speed forward traveling drive trains, i.e., the second speed forward traveling gear train and the fourth speed forward traveling gear train, are disposed downstream of second clutch 59.

Figure 6:
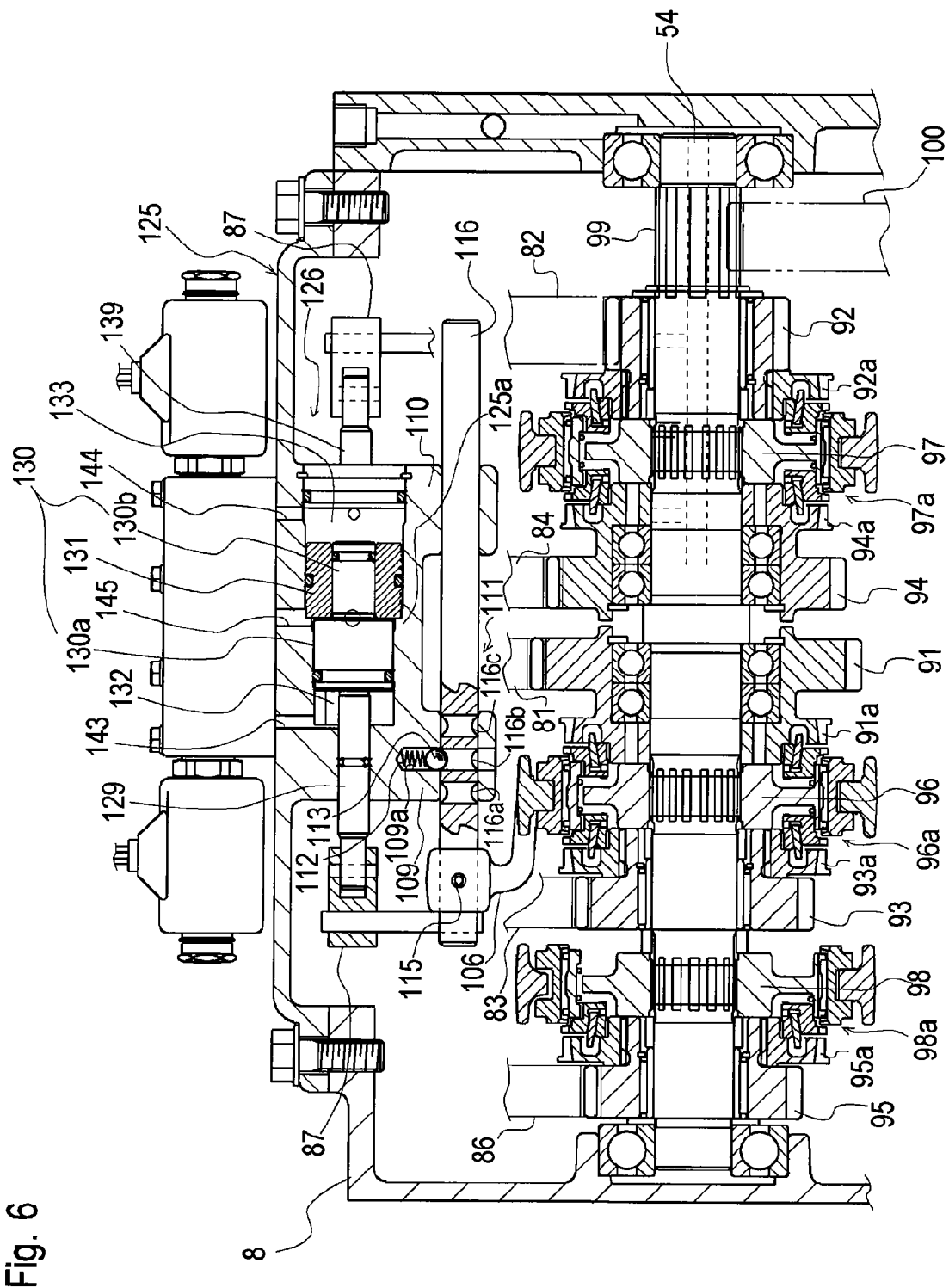
FIG. 6 is a fragmentary sectional side view of the transmission casing incorporating the dual clutch transmission.

As shown in FIGS. 3 and 6, on speed-change output shaft 54 are fixed a spline hub 96 between gears 91 and 93, a spline hub 97 between gears 92 and 94, and a spline hub 98 beside gear 95 (in this embodiment, between gears 95 and 93). Shifters 96a, 97a and 98a are axially slidably and relatively unrotatably fitted on respective spline hubs 96, 97 and 98.

Ends of respective driven gears 91 and 93 facing spline hub 96 therebetween are formed as respective clutch teeth portions 91a and 93a. Ends of respective driven gears 92 and 94 facing spline hub 97 therebetween are formed as respective clutch teeth portions 92a and 94a. An end of driven gear 95 facing spline hub 98 is formed as a clutch teeth portion 95a.

In this way, each of clutch teeth portions 91a, 92a, 93a, 94a and 95a is combined with corresponding shifter 96a, 97a or 98a so as to constitute a synchromesh-type clutch. That is, the combination of clutch teeth portion 91a and shifter 96a serves as a first speed forward traveling clutch. The combination of clutch teeth portion 92a and shifter 97a serves as a second speed forward traveling clutch. The combination of clutch teeth portion 93a and shifter 96a serves as a third speed forward traveling clutch. The combination of clutch teeth portion 94a and shifter 97a serves as a fourth speed forward traveling clutch. The combination of clutch teeth portion 95a and shifter 98a serves as a backward traveling clutch.

Due to this configuration, any one of these clutches is engaged, i.e., one of clutch teeth portions 91a, 92a, 93a, 94a and 95a is engaged with corresponding shifter 96a, 97a or 98a by a later-discussed shifter control system, thereby relatively unrotatably engaging the corresponding driven gear 91, 92, 93, 94 or 95 to speed-change output shaft 54, i.e., selecting the gear train including this driven gear to be driven.

The rotary force of either first or second speed-change shafts 52 or 53 can be transmitted to speed-change output shaft 54 through the gear train selected to be driven. In other words, when shifters 96a and 98a are controlled to select one of the gear trains downstream of first clutch 58 (i.e., the first speed forward traveling gear train, the third speed forward traveling gear train and the backward traveling gear train) to be driven, the selected gear train is actually driven by engaging first clutch 58. When a shifter 97a is controlled to select one of the gear trains downstream of second clutch 59 (i.e., the second speed forward traveling gear train and the fourth speed forward traveling gear train) to be driven, the selected gear train is actually driven by engaging second clutch 59.

A clutch control system for dual clutch transmission 19 will be described with reference to FIGS. 4 to 7. A first fork 106, a second fork 107 and a third fork 108 are fitted onto respective shifters 96a, 97a and 98a constituting the first to fourth speed forward traveling clutches and the backward traveling clutch, and are fixed at basal end bosses thereof through respective retaining pins 115 onto a first shifter shaft 116, a second shifter shaft 117 and a third shifter shaft 118, respectively.

A shifter shaft casing 125 is provided on an upper portion of transmission casing 8. Shifter shafts 116, 117 and 118 are laterally horizontally juxtaposed, are fore-and-aft horizontally extended in parallel in shifter shaft casing 125, and are fore-and-aft axially slidably passed through front and rear bearing walls 109 and 110 extended downward from shifter shaft casing 125. Therefore, forks 106, 107 and 108 are fore-and-aft horizontally slidable integrally with respective shifter shafts 116, 117 and 118 so as to slide respective shifters 96a, 97a and 98a.

First shifter shaft 116 for setting forward traveling odd-numbered speeds is provided with a detent mechanism 111 so as to be retained at one of a first speed forward traveling position, a neutral position and a third speed forward traveling position. In this regard, annular grooves 116a, 116b and 116c are formed on the outer peripheral surface of first shifter shaft 116. Groove 116a is defined as the first speed forward traveling position for engaging shifter 96a with clutch teeth portion 91a of driven gear 91. Groove 116b is defined as the third speed forward traveling position for engaging shifter 96a with clutch teeth portion 93a of driven gear 93. Groove 116c is defined as the neutral position for disengaging shifter 96a from both of clutch teeth portions 91a of driven gear 91. A downwardly opened upward recess 109a is formed in bearing wall 109, and a detent ball 113 is fitted into recess 109a through a compressed spring 112, so that detent ball 113 can be fitted at a bottom end thereof to one of grooves 116a, 116b and 116c according to the fore-and-aft slide of first shifter shaft 116. Second shifter shaft 117 for setting forward traveling even-number speeds is also provided with a similar detent mechanism so as to be retained at one of a second speed forward traveling position, a fourth speed forward traveling position and a neutral position. Further, third shifter shaft 117 for setting the backward traveling is also provided with a similar detent mechanism so as to be retained at one of a backward traveling position and a neutral position.

A first hydraulic cylinder 126, a second hydraulic cylinder 127 and a third hydraulic cylinder 128 are fore-and-aft horizontally extended in parallel in shifter shaft casing 125 so as to serve as actuators for controlling respective shifters 96a, 97a and 98a. A connection arm 87 is extended downward from one axial end of each of piston rods 129, 134 and 139 of respective hydraulic cylinders 126, 127 and 128, and is connected at a bottom end thereof to one axial end of each of shifter shafts 116, 117 and 118.

A first piston 130, including a large diameter portion 130a and a small diameter portion 130b, is fixed on the other end of piston rod 129 of first hydraulic cylinder 126. An annular second piston 131 having an outer diameter larger than that of large diameter portion 130a is axially slidably fitted on small diameter portion 130b. First and second pistons 130 and 131 serve as a piston 146. Piston 146 divides the inside space of first hydraulic cylinder 126 into fluid chambers 132 and 133. Fluid chambers 132 and 133 are fluidly connected to respective electromagnetic switching valves 119 and 120 through respective fluid passages 143 and 144.

Figure 5:
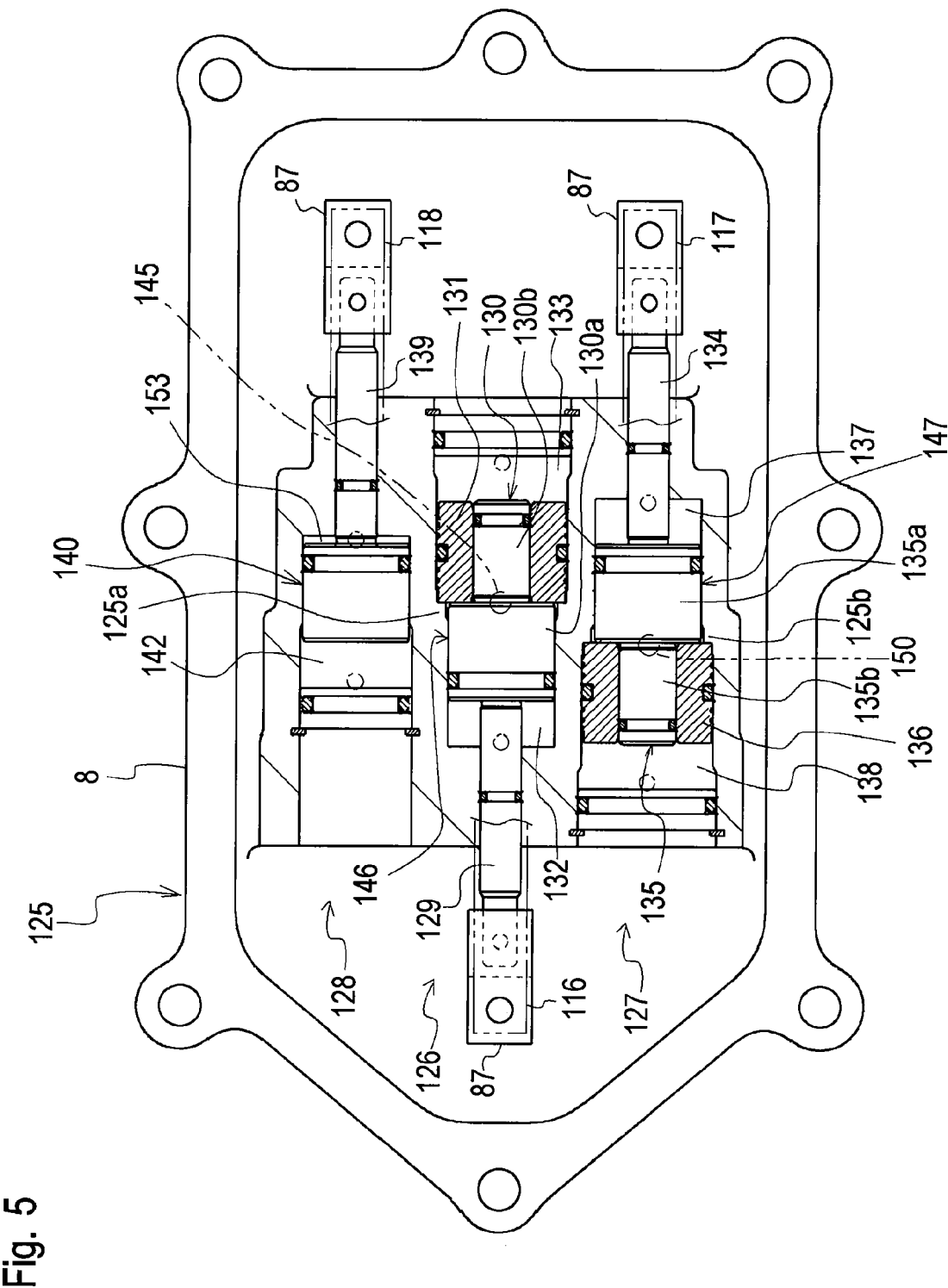
FIG. 5 is a fragmentary sectional bottom sectional view of a shifter-controlling cylinder chamber formed on a top of the transmission casing.

Shifter shaft casing 125 is formed with a shoulder surface 125a by radially stepping an axial intermediate portion of first hydraulic cylinder 126. Referring to FIG. 5, a diametrically large portion of first hydraulic cylinder 126 rightward from shoulder surface 125a is diametrically larger than a diametrically small portion of first hydraulic cylinder 126 leftward from shoulder surface 125a. The diametrically large portion of first hydraulic cylinder 126 is relatively slidably and fluid-tightly fitted to the outer peripheral surface of second piston 131, and its inner space outward (rightward in FIG. 5) from second piston 131 serves as fluid chamber 133. The diametrically small portion of second hydraulic cylinder 126 is relatively slidably and fluid-tightly fitted to the outer peripheral surface of first piston 130, and its inner space outward (leftward in FIG. 5) from first piston 130 serves as fluid chamber 132.

To set shifter shaft 116 at its neutral position, both of electromagnetic switching valves 119 and 120 are unexcited so as to supply fluid to both of fluid chambers 132 and 133 through respective fluid passages 143 and 144. Since a gap space between first and second pistons 130 and 131 is opened to a drain passage 145, first piston 130 moves rightward in FIG. 5, second piston 131 moves leftward in FIG. 5, and pistons 130 and 131 finally abut against each other. In this state, since the above-mentioned difference in diameter of first hydraulic cylinder 126 by forming shoulder surface 125a results in that the area of second piston 131 receiving the hydraulic pressure in fluid chamber 133 is larger than that of second piston 131 receiving the hydraulic pressure in fluid chamber 132, second piston 131 abuts against shoulder surface 125a as shown in FIG. 5, and is retained at this position defined as a neutral position of piston 146.

To set shifter shaft 116 at the first speed forward traveling position, only electromagnetic switching valve 120 is excited to stop the fluid supply to fluid chamber 133 through fluid passage 144. Accordingly, piston 146 is pushed toward fluid chamber 133 by the hydraulic pressure in fluid chamber 133, and finally reaches its first speed forward traveling position, where piston 146 as both pistons 130 and 131 abuts against the outer end of fluid chamber 132. To set shifter shaft 116 at the third speed forward traveling position, only electromagnetic switching valve 119 is excited to stop the fluid supply to fluid chamber 132 through fluid passage 143. Accordingly, the hydraulic pressure in fluid chamber 133 presses piston 146 toward fluid chamber 132, so that only first piston 130 moves toward fluid chamber 132 while leaving second piston 131 retained by shoulder surface 125a, and finally comes to abut against the outer end of fluid chamber 132. This state is defined as a third speed forward traveling position of piston 146.

Second hydraulic cylinder 127 is configured similar to first hydraulic cylinder 126. That is, second hydraulic cylinder 127 is provided with a shoulder surface 125b, and is provided therein with a piston 147, including a first piston 135, having a large diameter portion 135a and a small diameter portion 135b, and a second piston 136 relatively slidably fitted on first piston 135, with a fluid chamber 137 on one axial side of piston 147, and with a fluid chamber 138 on the other axial side of piston 147. Electromagnetic valves 121 and 122 are connected to respective fluid chambers 137 and 138 through respective fluid passages 148 and 149, and a gap between first and second pistons 135 and 136 is opened to a drain passage 150. Piston 147 is set at its neutral position by unexciting both valves 121 and 122, at a second speed forward traveling position by exciting only valve 122, and at a fourth speed forward traveling position by exciting only valve 121, so that second shifter shaft 117 connected to piston rod 134 extended from piston 147 (first piston 135) is switched among its neutral position, its second speed forward traveling position, and its fourth speed forward traveling position as mentioned above.

Piston rod 139 of third hydraulic cylinder 128 is fixedly provided with a piston 140 on the other axial end thereof opposite to connection arm 87. In third hydraulic cylinder 128, piston 140 is provided with a fluid chamber 142 on one axial side thereof, and with a fluid chamber 153 on the other axial side thereof. An electromagnetic switching valve 123 is connected to fluid chambers 142 and 153 through respective fluid passages 151 and 152.

When dual clutch transmission 19 is set for forward traveling or in a neutral state, valve 123 is unexcited so as to supply fluid to fluid chamber 142 and to drain fluid from fluid chamber 153, thereby setting piston 140 with piston rod 139 to its neutral position. When dual clutch transmission 19 is set for backward traveling, valve 123 is excited so as to supply fluid to fluid chamber 153 and to drain fluid from fluid chamber 142, thereby moving piston 140 with piston rod 139 leftward in FIG. 5, and setting it at its backward traveling position.

When dual clutch transmission 19 is set in the neutral state, e.g., on starting of engine 5, all electromagnetic switching valves 119, 120, 121, 122 and 123 are set at their unexcited positions. By issuing a gearshift command signal from a controller 90 shown in FIG. 9, valves 119 to 123 are controlled to engage one of shifters 96a, 97a and 98a to one of driven gears 91, 92, 93, 94 and 95, thereby selecting one of the gear trains of dual clutch transmission 19 to be driven. In this regard, when either the first or third speed forward traveling gear train is selected to be driven, piston 146 of first hydraulic cylinder 126 is set at either the first or third speed forward traveling position, while pistons 147 and 140 of cylinders 127 and 128 are set at their respective neutral positions. When the second or fourth speed forward traveling gear train is selected to be driven, piston 147 of second hydraulic cylinder 127 is set at either the second or fourth speed forward traveling position, while pistons 146 and 140 of cylinders 126 and 128 are set at their respective neutral positions. When the backward traveling gear train is selected to be driven, piston 140 of third hydraulic cylinder 128 is set at the backward traveling position, while pistons 146 and 147 of cylinders 126 and 127 are set at their respective neutral positions.

Figure 8:
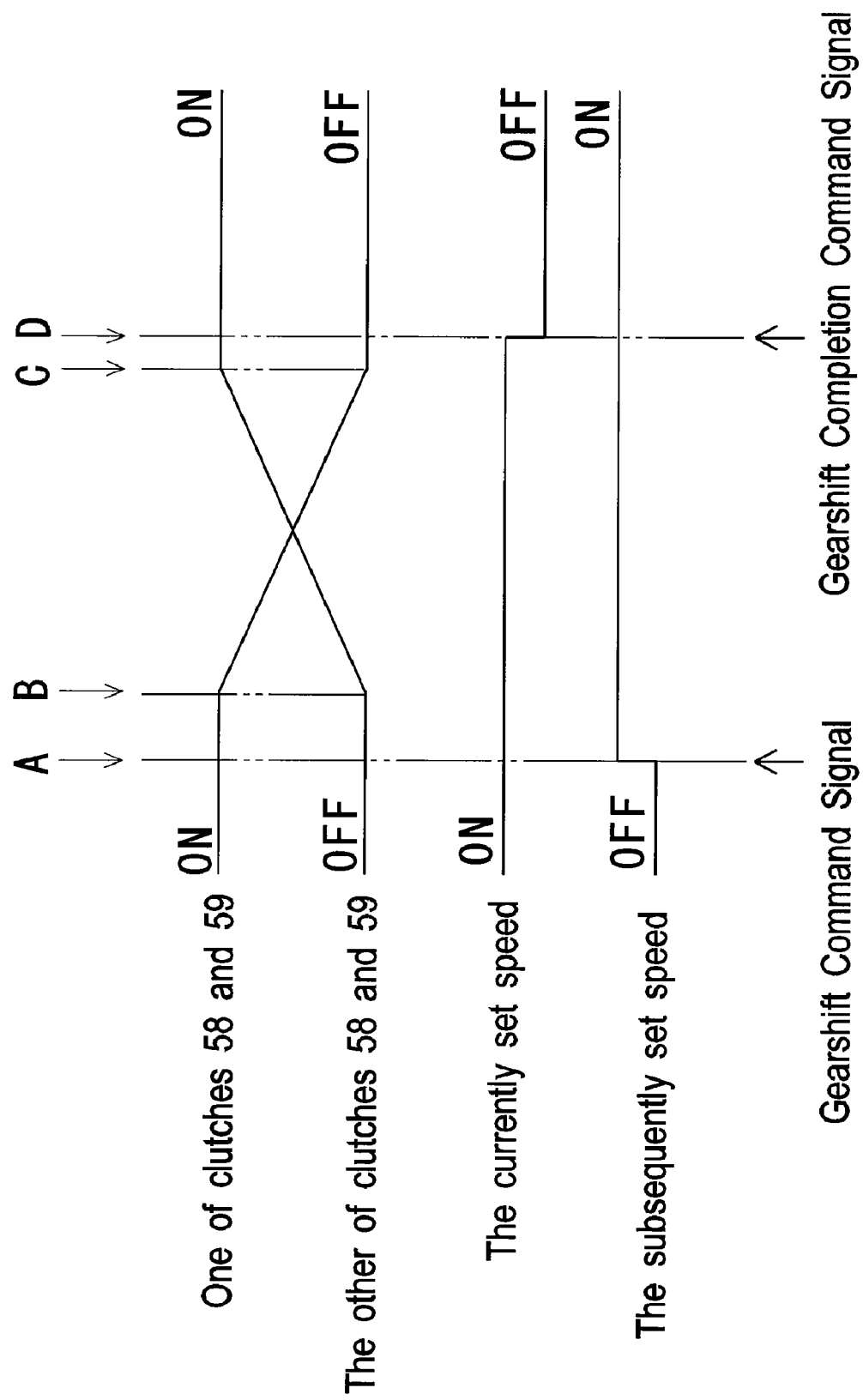
FIG. 8 is a time chart of clutch pressure variations and speed selection.

However, when the gearshift requires the engagement/disengagement interchange between first and second clutches 58 and 59, e.g., when dual clutch transmission 19 is gearshifted from the forward traveling first speed to the forward traveling second speed, as shown in FIG. 8, the next drive train to be driven is selected to be driven immediately after a timing A of issuance of the gearshift command signal, while keeping the presently driven drive train. In the above-mentioned example case, immediately after timing A, the second speed forward traveling gear train is selected to be driven while keeping the first speed forward traveling gear train driven. At this time, piston 146 of cylinder 126 is set at the first speed forward traveling position, piston 147 of cylinder 127 is set at the second speed forward traveling position, and only piston 140 is set at its neutral position. Afterward, as discussed later, the engagement action of one clutch 58 or 59 and the disengagement action of the other clutch 58 or 59 are progressed, and after the completion of the engagement/disengagement of clutches 58 and 59, controller 90 issues a gearshift complement command signal at a timing D, so that the last selected drive train (in the above example case, the first speed forward traveling gear train) is set to be not driven. At this time, there is realized the above-mentioned state that one of shifter 96a, 97a and 98a is engaged to one of driven gears 91, 92, 93, 94 and 95.

As shown in FIGS. 2 to 4, pumps 213 and 214 are laterally offset from gear casing 103, and mounted onto the front end of transmission casing 8 on a front end of forwardly extended input shaft 18, so as to be driven together by input shaft 18. A tank 201 is connected to transmission casing 8. Pump 214 absorbs fluid from tank 201 through a filter 220. As shown in FIG. 7, a delivery fluid passage from pump 214 is bifurcated into a fluid passage 154, including a filter 73, and a fluid passage 155. Fluid passage 154 supplies fluid through electromagnetic switching valves 119 to 123 to hydraulic cylinders 126, 127 and 128 for controlling the first to fourth speed forward traveling clutches and the backward traveling clutch. The fluid in fluid passage 155 is regulated by relief valve 69, and is supplied to hydraulic cylinder 71 for controlling first clutch 58 through electromagnetic proportional reducing valve 67, or to hydraulic cylinder 72 for controlling second clutch 59 through electromagnetic proportional reducing valve 68. As shown in FIG. 7, line filters 62, 64, 63 and 65 filter the fluid supplied to valves 67 and 68 and cylinders 71 and 72, respectively.

Due to electromagnetic proportional reducing valves 67 and 68, pistons 156 and 157 of respective cylinders 71 and 72 are gradually continuously (i.e., unintermittently) moved. For example, when first and second clutches 58 and 59 are multi-friction disc clutches, the continuous movements of pistons 156 and 157 result in the continuous variation of friction pressures among the friction discs of respective clutches 58 and 59 so as to continuously change the torque transmitted through each of clutches 58 and 59 during the process of the clutch between its engagement state and its disengagement state.

Incidentally, a lube fluid passage 158 is extended downstream of relief valve 69. The lubricating fluid in lube fluid passage 158 is regulated in pressure by a relief valve 70, and is supplied to clutches 58 and 59, and to other lubricated portions in dual clutch transmission 19 (generically named as a lubricated section 159).

As shown in FIGS. 4 and 7, in transmission casing 8, a horizontal plate-like partition 160 is extended from a lower wall portion of transmission casing 8 so as to divide the inside space of transmission casing 8 into upper and lower chambers 161 and 162. Upper chamber 161 above partition 160 incorporates dual clutch transmission 19, and lower chamber 162 below partition 160 serves as a fluid sump for collecting fluid falling from dual clutch transmission 19.

An opening 169 is provided sidewise (leftward) from an (left) end of partition 160 and vertically downward from front output shaft 56. Therefore, hydraulic pressure fluid leaked from hydraulic devices such as hydraulic cylinders 71, 72, 126, 127 and 128 and electromagnetic valves 67, 68, 119, 120, 121, 122 and 123 through passages 145, 150 and others, and the lubricating fluid after lubricating lubricated section 159, clutches 58 and 59, hydraulic cylinders 71 and 72, and so on, falls down (e.g., along the inside wall surface of transmission casing 8, and is collected into the fluid sump in chamber 162 through opening 169.

Further, a drain port 164 provided with a strainer is opened at a side wall of fluid sump chamber 162 in transmission casing 8, and connected to pump 213 through a pipe 165. Pump 213 is connected through a pipe 166 to an inlet 201a provided at a top portion of tank 201. Tank 201 is provided at a bottom portion thereof with an outwardly (downward) opened outlet 201b covered with oil filter 220 disposed inside tank 201. Outlet 201b is connected to pump 214 through a pipe 167. Pump 214 is connected through passages 154 and 155 to various hydraulic devices such as hydraulic cylinders 71, 72, 126, 127, 128 and electromagnetic valves 67, 68, 119, 120, 121, 122 and 123.

Due to this structure, during traveling of vehicle 1, pump 213 sucks fluid through pipe 165 from the fluid sump in chamber 162, so as to forcibly drain the fluid from drain port 164, and delivers the fluid through pipe 166 and inlet 201a into tank 201 disposed outside transmission casing 8. Therefore, even while engine 5 is driven for traveling of vehicle 1, tank 201 absorbs fluid from the inside of transmission casing 8 so as to keep the level of a fluid surface 163 of the fluid sump in transmission casing 8 lower than the lowest end of considerably high-speed rotated gears of multi-speed transmission 19. Pump 214 absorbs fluid from tank 201 through pipe 167, and supplies the fluid through passages 154 and 155 to dual clutch transmission 19 in transmission casing 8, thereby driving the hydraulic devices and lubricating various components and portions.

In this way, tank 201 is fluidly connected to transmission casing 8 so as to store fluid serving as the lubricating fluid for first and second clutches 58 and 59 and other portions in dual clutch transmission 19. Tank 201 absorbs fluid from transmission casing 8 so that the level of fluid surface 163 of the fluid sump in transmission casing 8 becomes lower than a predetermined height during activation of engine 5. Due to such a lowered level of fluid surface 163, power loss caused by resistance of fluid agitated by a high-speed rotating gear is reduced so as to ensure efficient and economic high-speed traveling of vehicle 1.

The fluid stored in tank 201 also serves as hydraulic pressure fluid for hydraulically controlled first and second clutches 58 and shifter shafts 116, 117 and 118, so as to require no additional device for supplying fluid to such hydraulic devices, thereby simplifying vehicle 1.

Here, even while traveling vehicle 1 is laterally tilted by a wrong ground condition, partition 160 prevents the high-speed rotating gears from being submerged into the fluid accumulated in chamber 162 which is tilted laterally following the tilt of vehicle 1, thereby reducing the resistance of fluid against the agitation by the gears. Incidentally, since front output shaft 56 is rotated slowly, opening 169 is disposed vertically downward (just below) front output shaft 56 so that, even if fluid overflows from chamber 162 through opening 169, only slowly rotating front output shaft 56 is submerged into the overflowing fluid so as to reduce the resistance of fluid against its agitation.

As mentioned above, pumps 213 and 214 are driven together by input shaft 18. Consequently, the quantity of fluid recovered from transmission casing 8 to tank 201 is proportional to the rotary speed of engine 5. Accordingly, even if the rotary speed of engine 5 is increased so as to increase fluid delivered from pump 214 into transmission casing 8, pump 213 increases the quantity of fluid recovered from transmission casing 8 into tank 201.

In this way, the quantity of fluid recovered from transmission casing 8 into tank 201 is increased according to increase of the rotary speed of engine 5, and is more than the quantity of fluid supplied from tank 201 into transmission casing 8 such as to serve as the lube and the hydraulic pressure fluid. Therefore, the level of fluid surface 163 in transmission casing 8 is kept at a predetermined height for satisfactory reduction of power loss by the resistance of fluid against agitation.

Tank 201 is disposed sidewise from transmission casing 8, and a substantially horizontal pipe 168 is extended from a vertically intermediate side wall of tank 201 and is opened into transmission casing 8 through an opening 168a above partition 160, so that excessive fluid stored in tank 201 overflows from tank 201 into transmission casing 8 through pipe 168 so as to lubricate gears of dual clutch transmission 19. Pipe 168 is considerably lower than inlet 201a so as to prevent fluid in tank 201 from closing (overflowing from) inlet 201a. Therefore, even if fluid drained from drain port 164 involves much air caused by the lowering of fluid level in transmission casing 8 during traveling of vehicle 1, fluid delivered from pump 213 is necessarily dropped down from inlet 201a to the fluid sump in tank 201, thereby separating the air from the dropped fluid. Consequently, the fluid supplied from tank 201 into transmission casing 8 involves no air so as to properly function as lubricating fluid and hydraulic pressure fluid for dual clutch transmission 19. Alternatively, tank 201 may be formed in transmission casing 8 by partitioning the inside space of transmission casing 8.

Dual clutch transmission 19 having the above configuration is automatically gearshifted in association with the correlation between an accelerator pedal depression (i.e., an accelerator position) operatively connected to an engine throttle and an actual vehicle traveling speed. A gearshift process of dual clutch transmission 19 will be described with reference to FIGS. 3 to 8.

A clutch control for shift up from the first speed forward traveling position to the second speed forward traveling position during traveling of vehicle 1 will be described as a representative gearshift. Referring to FIG. 8, during forward traveling of vehicle 1 at the first speed, first clutch 58 is engaged, i.e., clutched on, so that the hydraulic clutch pressure of first clutch 58 supplied by hydraulic cylinder 71 is a rated value (i.e., a maximum value). At this time, valve 120 is excited so as to retain first shifter shaft 116 with fork 106 at the first speed forward traveling position and to engage shifter 96a to first speed forward traveling driven gear 91 (i.e., the first speed forward traveling clutch is engaged), thereby drivingly connecting transmission output shaft 54 to first speed-change shaft 52 through the first speed forward traveling gear train including gears 81 and 91, and thereby receiving the power of engine 5 from input shaft 18 through clutch input shaft 51, engaged first clutch 58, first speed-change shaft 52 and the first speed forward traveling gear train, so as to output the power to front and rear transaxles 12 and 13 through center differential unit 101. On the other hand, second clutch 59 is disengaged, i.e., clutched off, so that the hydraulic clutch pressure of second clutch 59 supplied by hydraulic cylinder 72 is a minimum value. At this time, second shifter shaft 117 is retained together with fork 107 at its neutral position so as to retain shifter 97a at its neutral position. In other words, the second speed forward traveling clutch is disengaged.

Then, for example, the accelerator pedal depression is increased so as to increase the engine throttle opening degree and to increase the actual vehicle traveling speed, at timing A, as mentioned above, controller 90 issues the gearshift command signal for shift up from the forward traveling first speed to the forward traveling second speed. At this time, gears 82 and 92 of the second speed forward traveling gear train connected to second clutch 59 is engaged to transmission output shaft 54, i.e., the second speed forward traveling clutch is engaged, while the engagement of first clutch 58, the engagement of gears 81 and 91 of the first speed forward traveling gear train from first clutch 58 to transmission output shaft 54 (i.e., the engagement of the first speed forward traveling clutch), and the disengagement of second clutch 59 are kept. In this regard, unexcited valve 122 is excited so as to move piston rod 134 of second hydraulic cylinder 127, thereby setting second shifter shaft 117 with fork 107 at the second speed forward traveling position. Accordingly, shifter 97a slides from its neutral position to the second speed forward traveling position, and meshes with second speed forward traveling driven gear 92, thereby drivingly connecting transmission output shaft 54 to second speed-change shaft 53 through gears 82 and 92 of the second speed forward traveling gear train. However, second clutch 59 is still disengaged, i.e., clutched off, so as to isolate the second speed forward traveling gear train from the power of engine 5, thereby preventing the engagement of the second speed forward traveling clutch from suddenly stressing the power train of dual clutch transmission 19.

After the gearshift command signal is issued, the engagement of the second speed forward traveling gear train to transmission output shaft 54 is ascertained, and then, at a timing B, controller 90 issues a clutch interchange signal so as to begin the reduction of clutch pressure of first clutch 58 and the increase of clutch pressure of second clutch 59, and afterward, according to the proportional shift of electromagnetic reducing valves 67 and 68, pistons 156 and 157 of respective hydraulic cylinders 71 and 72 gradually move so that engaged first clutch 58 gradually acts to be disengaged by reducing its clutch pressure, and meanwhile, disengaged second clutch 59 gradually acts to be engaged by increasing its clutch pressure. Thus, on the way of the clutch interchange process, both clutches 58 and 59 are half-clutched on so as to distribute power of engine 5 between the first speed forward traveling gear train and the second speed forward traveling gear train. As the reduction of clutch pressure of first clutch 58 and the increase of clutch pressure of second clutch 59 are progressed, the power transmitted through the first speed forward traveling gear train is reduced, and meanwhile, the power transmitted through the second speed forward traveling gear train is increased. Therefore, during the clutch interchange process, power of engine 5 is continuously transmitted to transmission output shaft 54 without intermittence.

At a timing C, first clutch 58 is completely disengaged (clutched off), and second clutch 59 is completely engaged (clutched on). At a timing D in a while after timing C, as mentioned above, controller 90 issues the gearshift completion command signal so as to disengage gears 81 and 91 of the first speed forward traveling gear train from traveling output shaft 54 (i.e., to disengage the first speed forward traveling clutch). In this regard, excited electromagnetic switching valve 120 is unexcited so as to move piston rod 129 of first hydraulic cylinder 126, thereby moving first shifter shaft 116 with fork 106 to its neutral position piston rod 129 of cylinder 126. Accordingly, shifter 96a is separated from first speed forward traveling driven gear 91 and is slid to its neutral position. In this way, the gearshift from the forward traveling first speed to the forward traveling second speed is completed by disengaging the first speed forward traveling clutch, i.e., by canceling the selection of the first speed forward traveling gear train to be driven, after the completion of disengagement of clutch 58 and engagement of clutch 59. Therefore, the disengagement of the first speed forward traveling clutch is prevented from suddenly stressing the power train of dual clutch transmission 19.

Besides the shift up from the first speed to the second speed, the shift down from the second speed to the first speed, the shift up and down between the second speed and the third speed, and the shift up and down between the third speed and the fourth speed, i.e., each of the gearshift of dual clutch transmission 19 for forward traveling between neighboring odd-numbered and even-numbered speeds is performed as mentioned above referring to FIG. 8. That is, at first, the disengaged next speed clutch is engaged (i.e., the next speed gear train is selected to be driven), and then, the disengagement of engaged one of clutches 58 and 59 and the engagement of the disengaged other of clutches 58 and 59 are simultaneously progressed, and finally, the engaged last speed clutch is disengaged (i.e., the selection of the last speed gear train to be driven is canceled). Since the engagement action of one of clutches 58 and 59 and the disengagement action of the other of clutches 58 and 59 are progressed overlapping each other while both the last and next speed gear trains are selected to be driven, the power of engine 5 is transmitted without intermittence to front and rear drive wheels 37 and 26 so as to ensure smooth speed change of traveling vehicle 1, thereby ensuring an appropriate traveling performance of vehicle 1, e.g., surely enabling vehicle 1 to climb a slope.

Referring to FIGS. 8 to 20, description will now be given of an automatic speed control system for realizing the above-mentioned gearshift process, and of various gearshift patterns in reaction to various mode settings by using the automatic speed control system.

Figure 9:
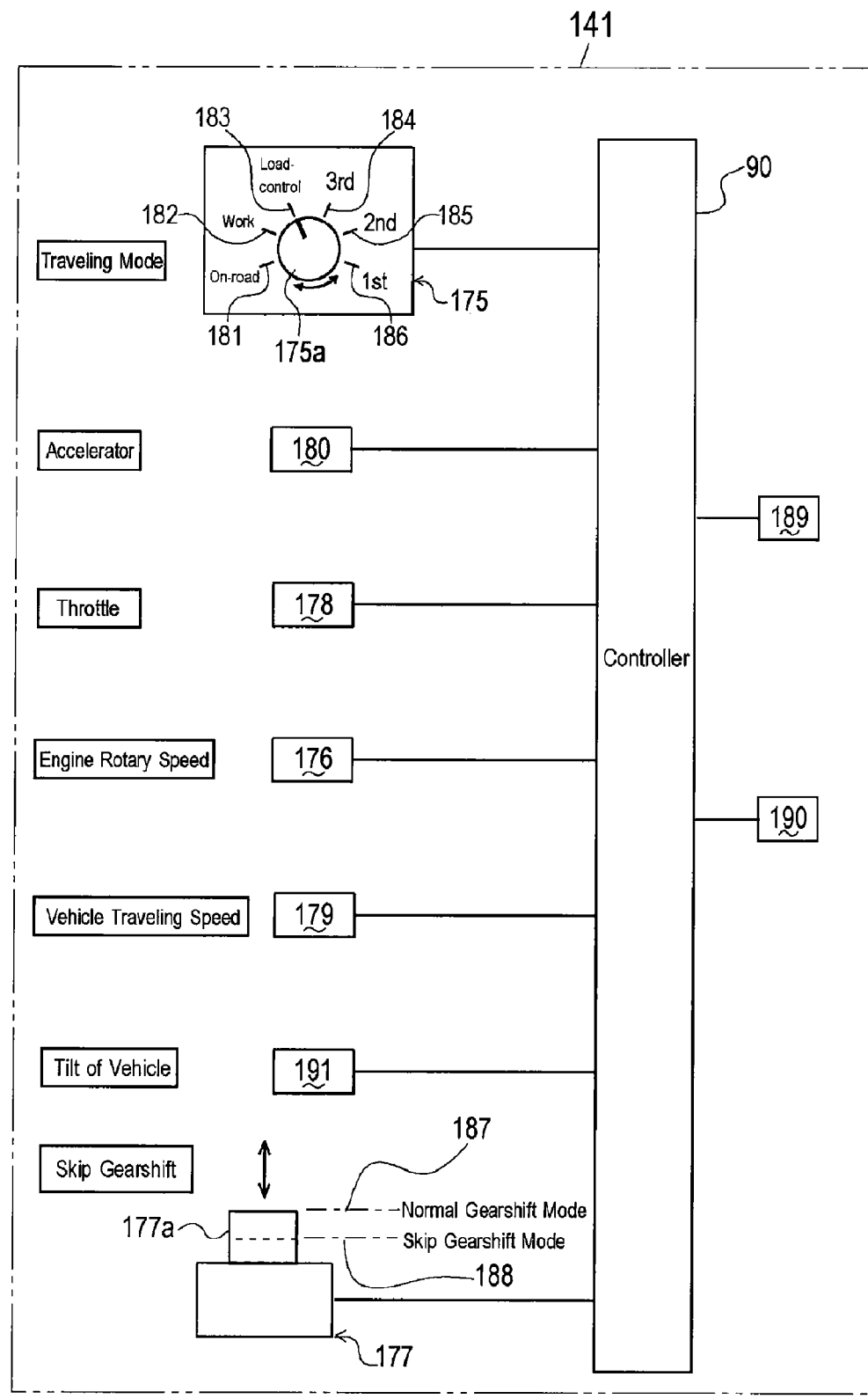
FIG. 9 is a block diagram of an automatic speed control system for controlling the actuators.

FIG. 9 illustrates an automatic speed control system 141 for the automatic gearshift control as mentioned above. Automatic speed control system 141 includes a clutch controlling electromagnetic proportional reducing valve group 189 and a shifter controlling electromagnetic switching valve group 190. Valve group 189 includes electromagnetic proportional reducing valves 67 and 68 for controlling respective hydraulic cylinders 71 and 72 serving as actuators for controlling respective first and second clutches 58 and 59. Valve group 190 includes electromagnetic switching valves 119, 120, 121 and 122 for controlling the respective first to fourth speed forward traveling clutches constituted by shifters 96*a* and 97*a*. Valve groups 189 and 190, serving as output means for gearshift of dual clutch transmission 19, are electrically connected to controller 90. Input means, including a traveling mode switch 175, an accelerator position sensor 180, a throttle opening sensor 178, an engine rotary speed sensor 176, a vehicle traveling speed sensor 179, a vehicle tilt angle sensor 191, and a skip mode switch 177, are electrically connected to controller 90.

A traveling mode selection device 175*a*, such as a dial or a lever (in this embodiment, a traveling mode selection dial), is provided for switching traveling mode switch 175. Traveling mode selection dial (hereinafter, simply referred to as "dial") 175*a* is provided with set positions 181, 182, 183, 184, 185 and 186. When dial 175*a* is set at one of positions 181, 182 and 183, dual clutch transmission 19 is automatically gearshifted while the fourth speed is defined as the maximum speed. When dial 175*a* is set at one of positions 184, 185 and 186, dual clutch transmission 19 is automatically gearshifted while a speed of dual clutch transmission 19 appointed to correspond to the set position is defined as the maximum speed in the set mode.

In a work traveling mode set by setting dial 175*a* at position 182, the first speed, which is the lowest speed of dual clutch transmission 19, is defined as the lowest speed in this set mode, i.e., a starting-and-stopping speed to be automatically set on starting of vehicle 1 and immediately before stopping of vehicle 1, thereby enabling vehicle 1 to travel with a high torque at a low speed for various works.

In an on-road traveling mode set by setting dial 175*a* at position 181, the second speed of dual clutch transmission 19 is defined as the start-and-stopping speed. Therefore, neither the shift up from the first speed to the second speed immediately after starting of vehicle 1 nor the shift down from the second speed to the first speed immediately before stopping of vehicle 1 is realized, thereby smoothening the acceleration by depressing the accelerator pedal immediately after the starting of vehicle 1 and the deceleration by releasing the depression of the accelerator pedal immediately before the stopping of vehicle 1, and thereby eliminating the uneconomical excessive torque caused by the first speed. Alternatively, the starting-and-stopping speed in the normal traveling mode may be the third speed or the fourth speed, or a speed higher than the third speed if it is provided in dual clutch transmission 19.

In a load control traveling mode set by setting dial 175*a* at position 183, essentially, the starting-and-stopping speed is the second speed (or a speed higher than the second speed), similar to that in the on-road traveling mode. However, the second speed is shifted down to the first speed as soon as an engine load detected during the second speed traveling is excessive.

In a third speed rated traveling mode set by setting dial 175*a* at position 184, the third speed is defined as the maximum speed in this set mode, and dual clutch transmission 19 is automatically gearshifted between the first and second speeds and between the second and third speeds. In a second speed rated traveling mode set by setting dial 175*a* at position 185, the second speed is defined as the maximum speed in this set mode, and dual clutch transmission 19 is automatically gearshifted between the first and second speeds. In other words, when a vehicle traveling speed is reduced, dual clutch transmission 19 is automatically shifted down, and as the vehicle traveling speed returns to the appointed speed, dual clutch transmission 19 is automatically shifted up. In a first speed rated traveling mode set by setting dial 175*a* at position 186, vehicle 1 travels at only the first speed while this mode is set.

Accelerator position sensor 180 detects an operation degree of an accelerator operation device (e.g., a depression of an accelerator pedal), i.e., an accelerator position, converts its detection value into an accelerator position signal, and issues the signal to controller 9. Throttle opening sensor 178 detects an opening degree of a throttle valve provided on an air intake line of engine 5, converts its detection value into a throttle opening signal, and issues the signal to controller 90. Engine rotary speed sensor 176 detects a rotary speed of output shaft 6 of engine 5, converts its detection value into an engine rotary signal, and issues the signal to controller 90. Vehicle traveling speed sensor 179 detects a rotary speed of an output portion of dual clutch transmission 19, e.g., front or rear output shaft 10 or 11, converts its detection value into an output rotary speed signal, and issues the signal to controller 90. Controller 90 calculates an actual vehicle traveling speed based on the output rotary speed signal. Vehicle tilt angle sensor 191 detects a tilt angle of vehicle 1 in its traveling direction, converts its detection value into a vehicle tilt angle signal, and issues the signal to controller 90.

A skip mode setting device 177*a*, such as a toggle switch type button or a lever (in this embodiment, "skip mode button"), is switchable between a normal gearshift mode position 187 and a skip gearshift mode position 188 so as to switch on/off skip mode switch 177. In a normal gearshift mode set by setting skip mode button 177*a* (hereinafter, simply referred as "button") a normal gearshift mode position 187, automatic speed control system 141 controls electromagnetic valves 189 and 190 for controlling first and second clutches 58 and 59 and the first to fourth speed forward traveling clutches so as to constantly gearshift dual clutch transmission 19 one speed by one speed.

In a skip gearshift mode set by setting button 177*a* at a skip gearshift mode position 188, automatic speed control system 141 controls electromagnetic valves 189 and 190 for controlling first and second clutches 58 and 59 and the first to fourth speed forward traveling clutches so as to gearshift dual clutch transmission 19 by skipping driving of one or more speed gear trains. In this regard, in the later-discussed embodiment, a certain speed, i.e., the third speed, is predetermined as the speed to be skipped. Alternatively, continuous plural speed may be skipped, or one or more speeds to be skipped may be determined each time based on the currently set speed. Various speed-skip patterns are adaptable only if they ensure skip of one or more speeds.

Controller 90 is programmed with gearshift point characteristic maps 171, 172, 173, 174, 175, 176, 177 and 178 as shown in FIGS. 10 to 17, corresponding to the respective traveling modes and the respective gearshift modes (the skip gearshift mode and the normal gearshift mode). Each of the gearshift point characteristic maps is a correlation diagram of accelerator position (detected by accelerator position sensor 180) to vehicle traveling speed (vehicle traveling speed sensor 179). The variation of the accelerator position, e.g., the depression of an accelerator pedal, is indicated as the axis of ordinates. It may be replaced with a variation of throttle opening (throttle opening degree of engine 5 detected by throttle opening sensor 178), or the quantity of fuel injection if engine 5 is a diesel engine. Any parameter may define the axis of ordinates only if it can be defined as a parameter designating the operation degree of means controlling the output of engine 5.

Figure 10:
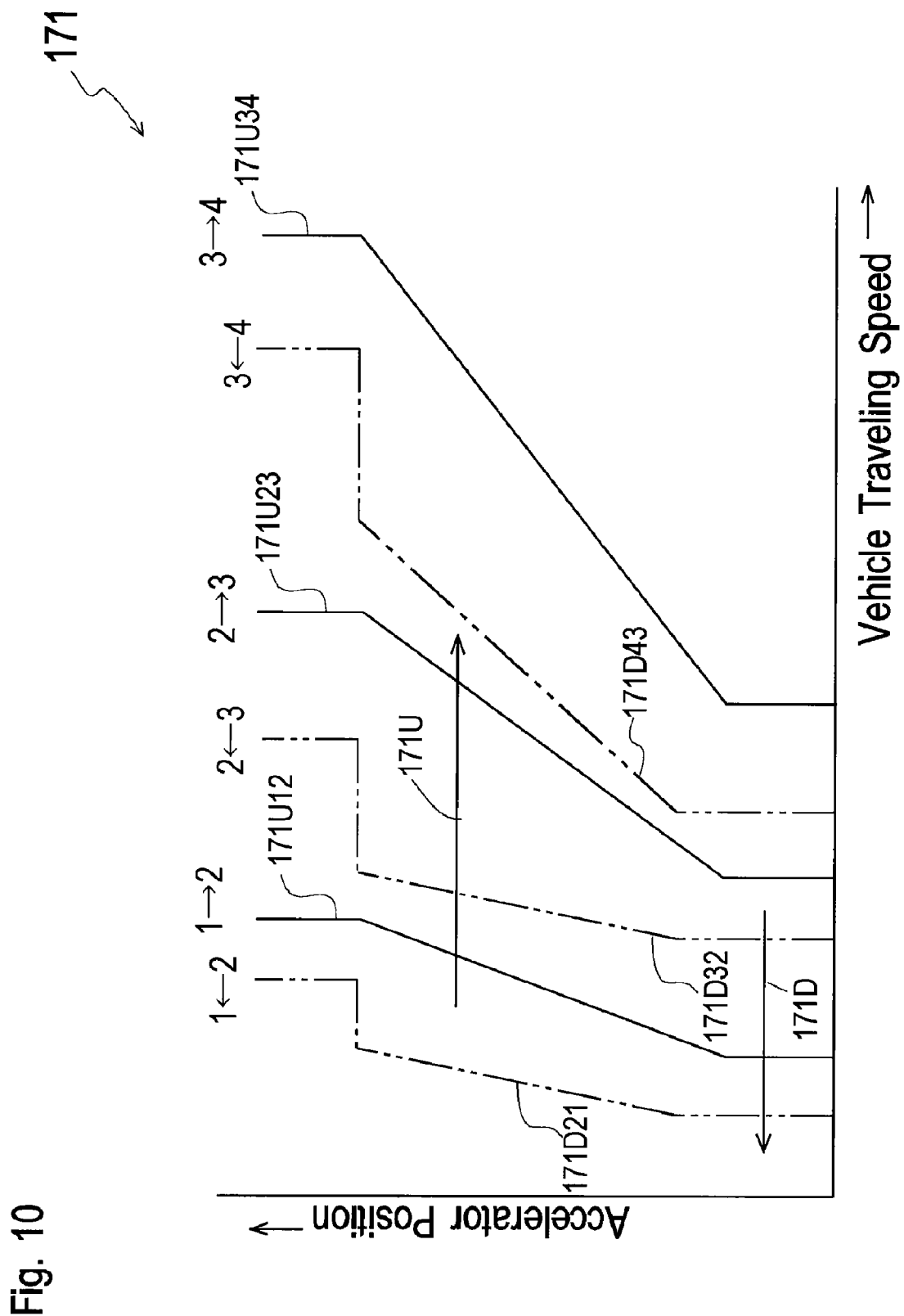
FIG. 10 is a correlation diagram as a gearshift point characteristic map for a work traveling and normal gearshift mode.
Figure 11:
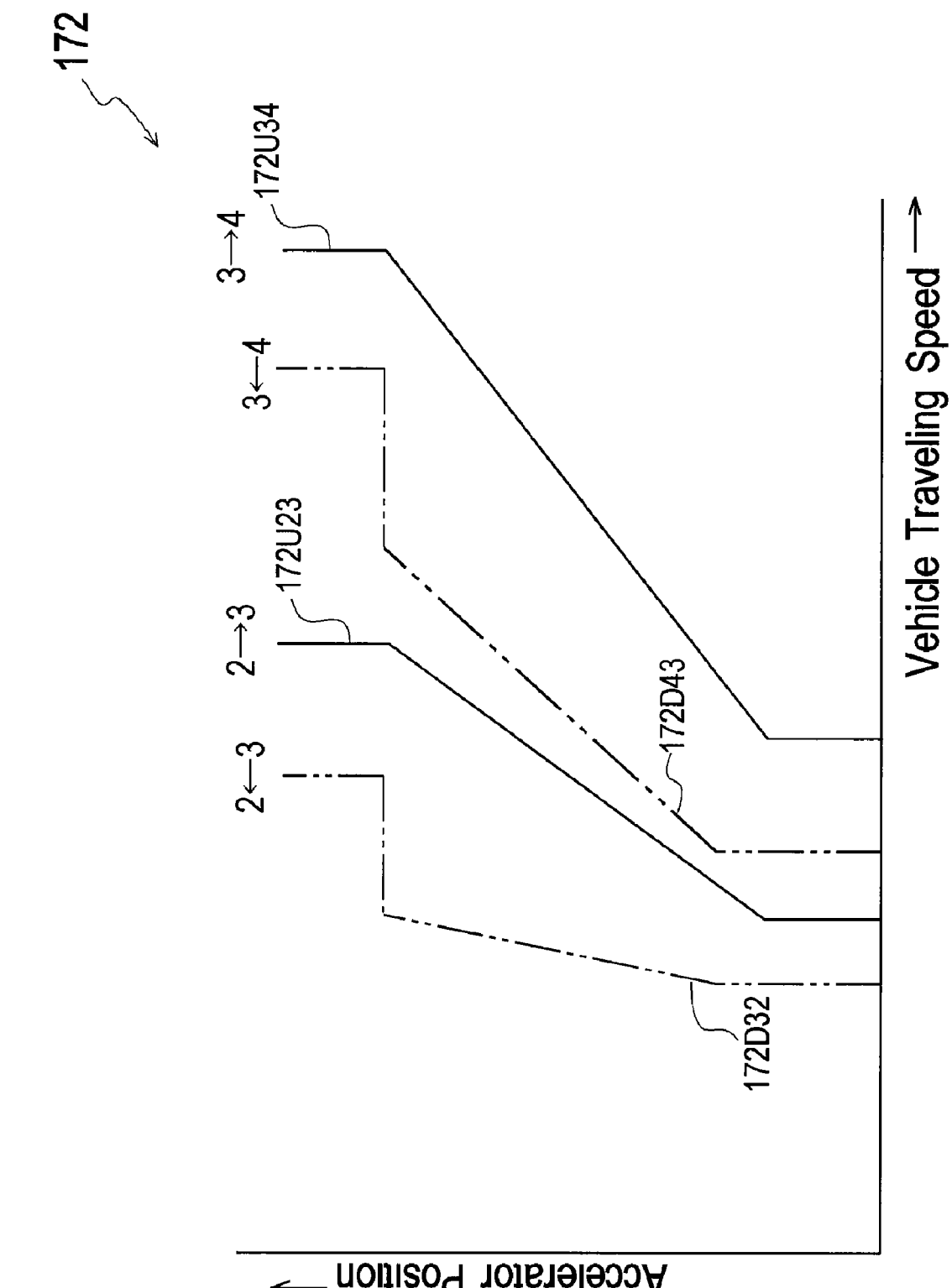
FIG. 11 is a correlation diagram as a gearshift point characteristic map for an on-road traveling and normal gearshift mode.
Figure 12:
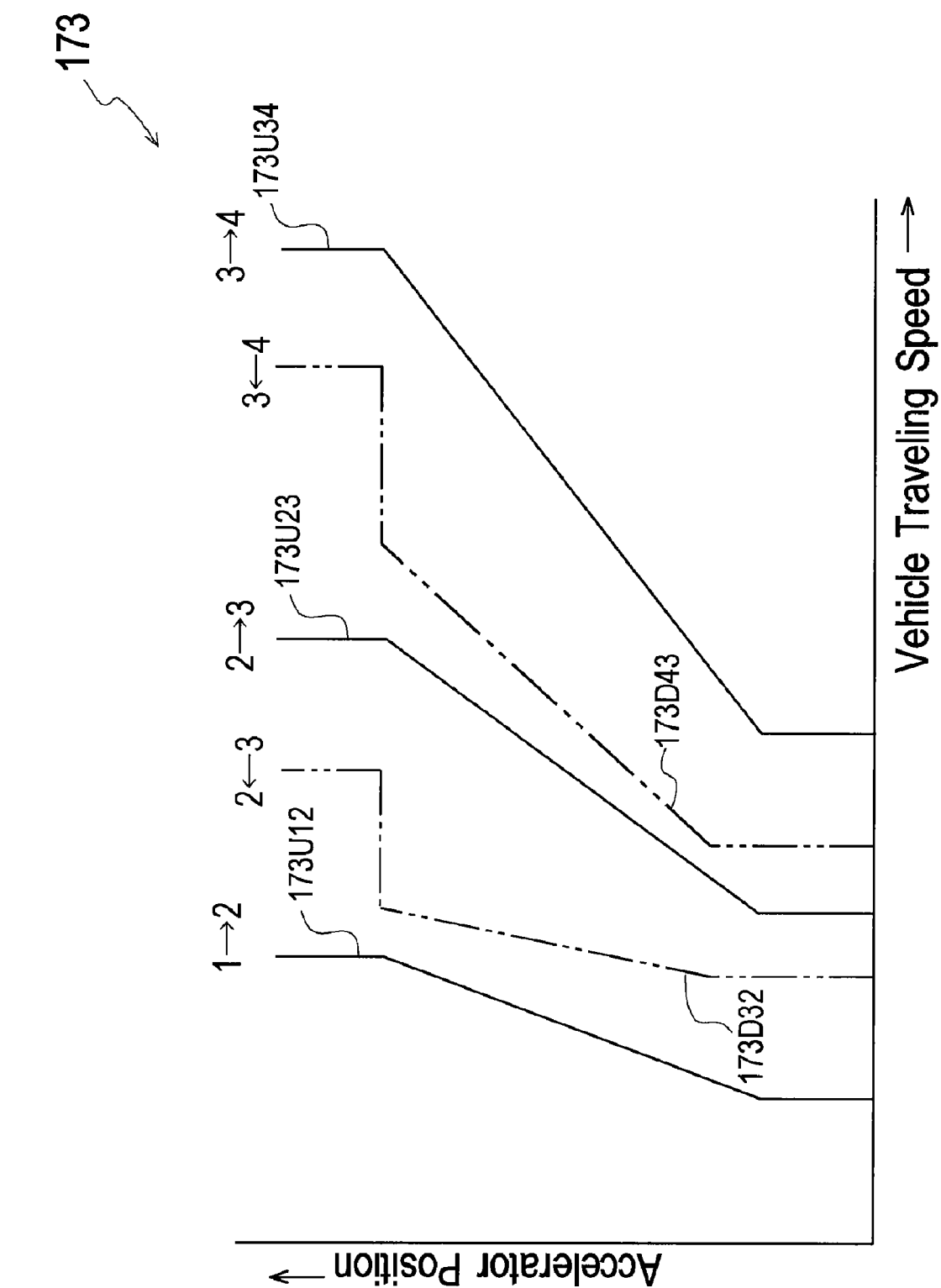
FIG. 12 is a correlation diagram as a gearshift point characteristic map for a load-control traveling and normal gearshift mode.

A representative gearshift clutch control pattern due to the gearshift point characteristic map will be descried with reference to FIGS. 8 and 10. According to detection of the accelerator position and the vehicle traveling speed by sensors 180 and 179, when the correlation between their detection values agrees with a point on a corresponding gearshift point line of gearshift point lines 171U12, 171D21, 171U23, 171D32, 171U34 and 171D43 in map 171, the automatic gearshift control is performed so as to realize the representative gearshift process as shown in FIG. 8, for example.

For example, it is assumed that, while vehicle 1 travels at the first speed, an accelerator pedal is depressed to a depression degree corresponding to the third speed. The vehicle traveling speed is increased according to a shift up line 171U while keeping the throttle valve opening at a certain degree. When the increased vehicle traveling speed reaches gearshift point line 171U12, this time is defined as timing A shown in FIG. 8, so that controller 90 issues the gearshift command signal so as to perform the clutch control for shift up from the first speed to the second speed. That is, the second speed forward traveling clutch is engaged at timing A, and then, engaged first clutch 58 is disengaged, and meanwhile, disengaged second clutch 59 is engaged. After the completion of disengagement of first clutch 58 and engagement of second clutch 59, controller 90 issues the gearshift completion command signal so as to disengage the first speed forward traveling clutch, thereby completing the shift up to the second speed.

Further, the vehicle traveling speed is increased, and when the increased vehicle traveling speed reaches gearshift point line 171U23, the clutch control for shift up from the second speed to the third speed is performed according to a process similar to the above-mentioned process shown in FIG. 8. In this regard, when the vehicle traveling speed reaches gearshift point line 171U23, controller 90 issues a gearshift command signal, thereby engaging the third speed forward traveling clutch. Then, the disengaged first clutch 58 is engaged, and meanwhile, the engaged second clutch 59 is disengaged. After the completion of engagement of clutch 58 and disengagement of clutch 59, controller 90 issues the gearshift completion command signal so as to disengage the second speed forward traveling clutch, thereby completing the shift up to the third speed.

On the contrary, when the depression of the accelerator pedal is reduced to a degree corresponding to the first speed, the vehicle traveling speed is reduced according to a shift down line 171D while keeping the accelerator position at a certain degree. When the reduced vehicle traveling speed reaches gearshift point line 171D32, the second speed forward traveling clutch is disengaged, subsequently the simultaneous disengagement of first clutch 58 and engagement of second clutch 59 are performed, and finally the third speed forward traveling clutch is engaged, thereby shifting down from the third speed to the second speed. When the further reduced vehicle traveling speed reaches gearshift point line 171D21, the first speed forward traveling clutch is disengaged, subsequently the simultaneous engagement of first clutch 58 and disengagement of second clutch 59 are performed, and finally the second speed forward traveling clutch is engaged, thereby shifting down from the second speed to the first speed.

If the vehicle traveling speed is increased during the third speed traveling and reaches gearshift point line 171U34, the fourth speed forward traveling clutch is engaged, subsequently the simultaneous disengagement of clutch 58 and engagement of clutch 59 are performed, and finally the third speed forward traveling clutch is disengaged, thereby shifting up from the third speed to the fourth speed. If the vehicle traveling speed is reduced during the fourth speed traveling and reaches gearshift point line 171D43, the third speed forward traveling clutch is engaged, subsequently the simultaneous engagement of clutch 58 and disengagement of clutch 59 are performed, and finally the fourth speed forward traveling clutch is disengaged, thereby shifting down from the fourth speed to the third speed.

Incidentally, in each map, each gearshift point line for a shift up between one speed and another corresponds to a vehicle traveling speed higher than that to which the gearshift line for shift down between the same speeds corresponds. For example, in map 171 of FIG. 10, gearshift point line 171U12 for shift up from the first speed to the second speed corresponds to a vehicle traveling speed higher than that to which gearshift point line 171D21 for shift down from the second speed to the first speed corresponds. Similarly, gearshift point line 171U23 for shift up from the second speed to the third speed corresponds to a vehicle traveling speed higher than that to which gearshift point line 171D32 for shift down from the third speed to the second speed corresponds. Therefore, the gearshift of dual clutch transmission 19 is prevented from excessively sensitively responding to the variation of vehicle traveling speed.

Figure 18:
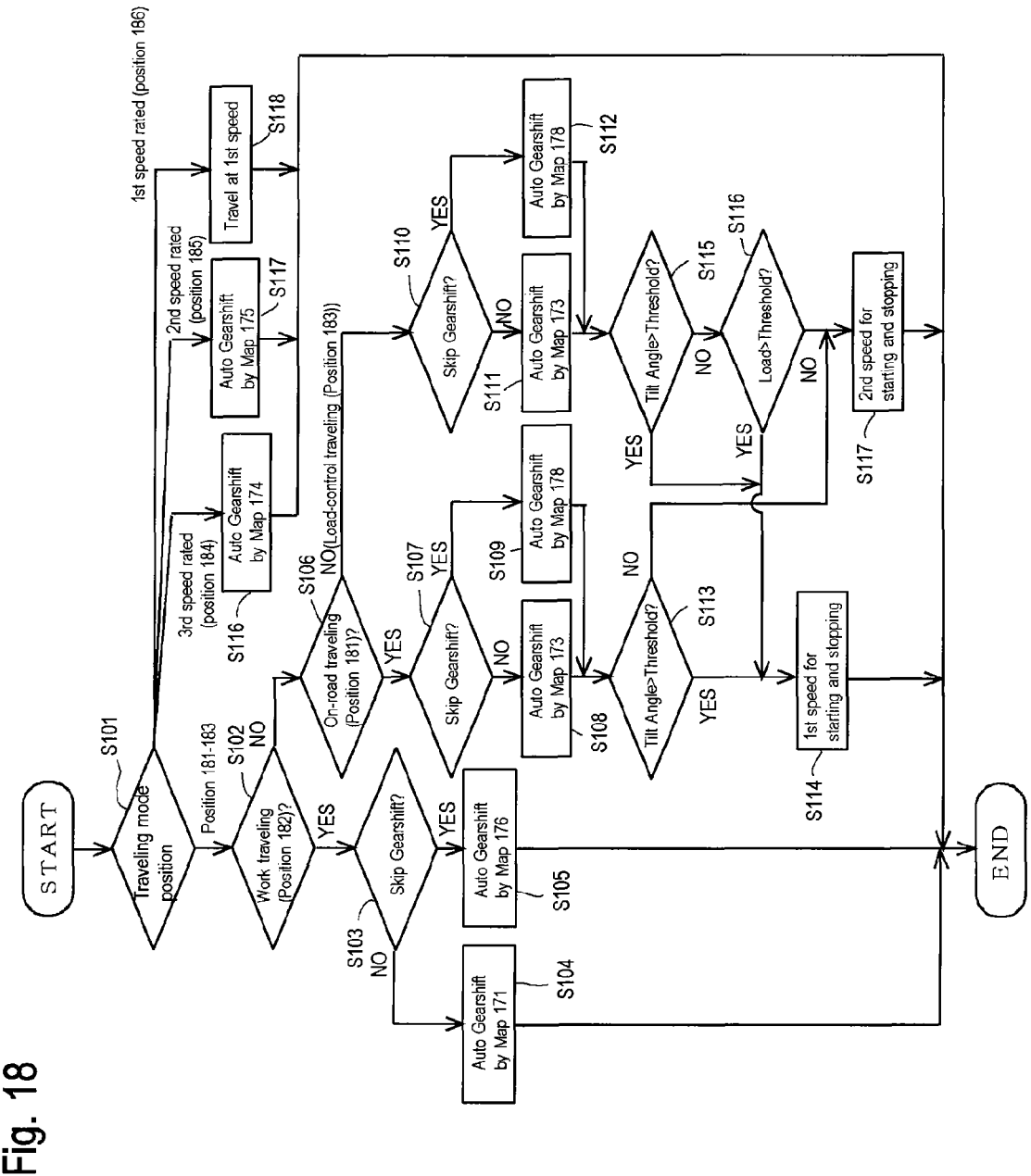
FIG. 18 is a flow chart for selection of gearshift pattern of the dual clutch transmission based on selection of traveling modes, on whether or not the skip gearshift mode is set, and on detection of a tilt angle of the vehicle.
Figure 19:
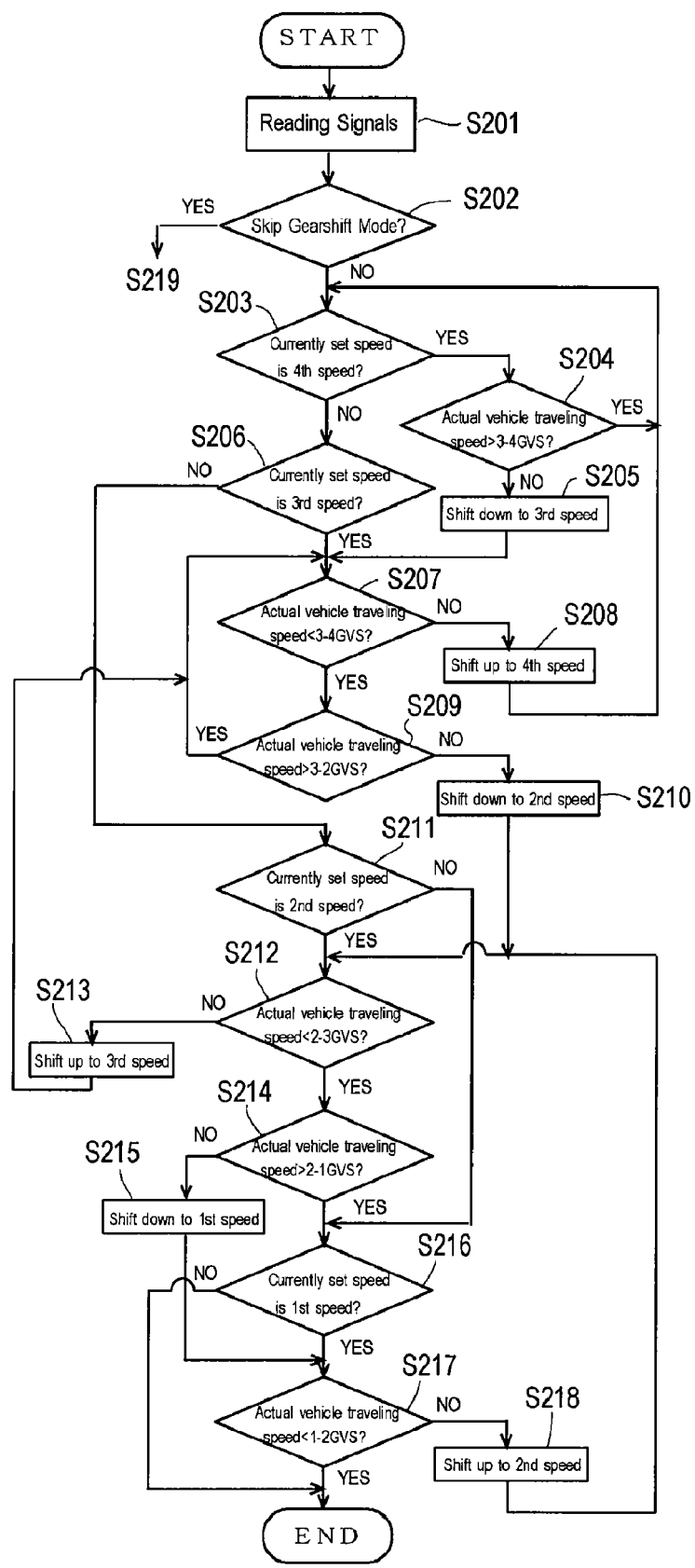
FIG. 19 is a flow chart of automatic gearshift of the dual clutch transmission set in the work traveling and normal gearshift mode.
Figure 20:
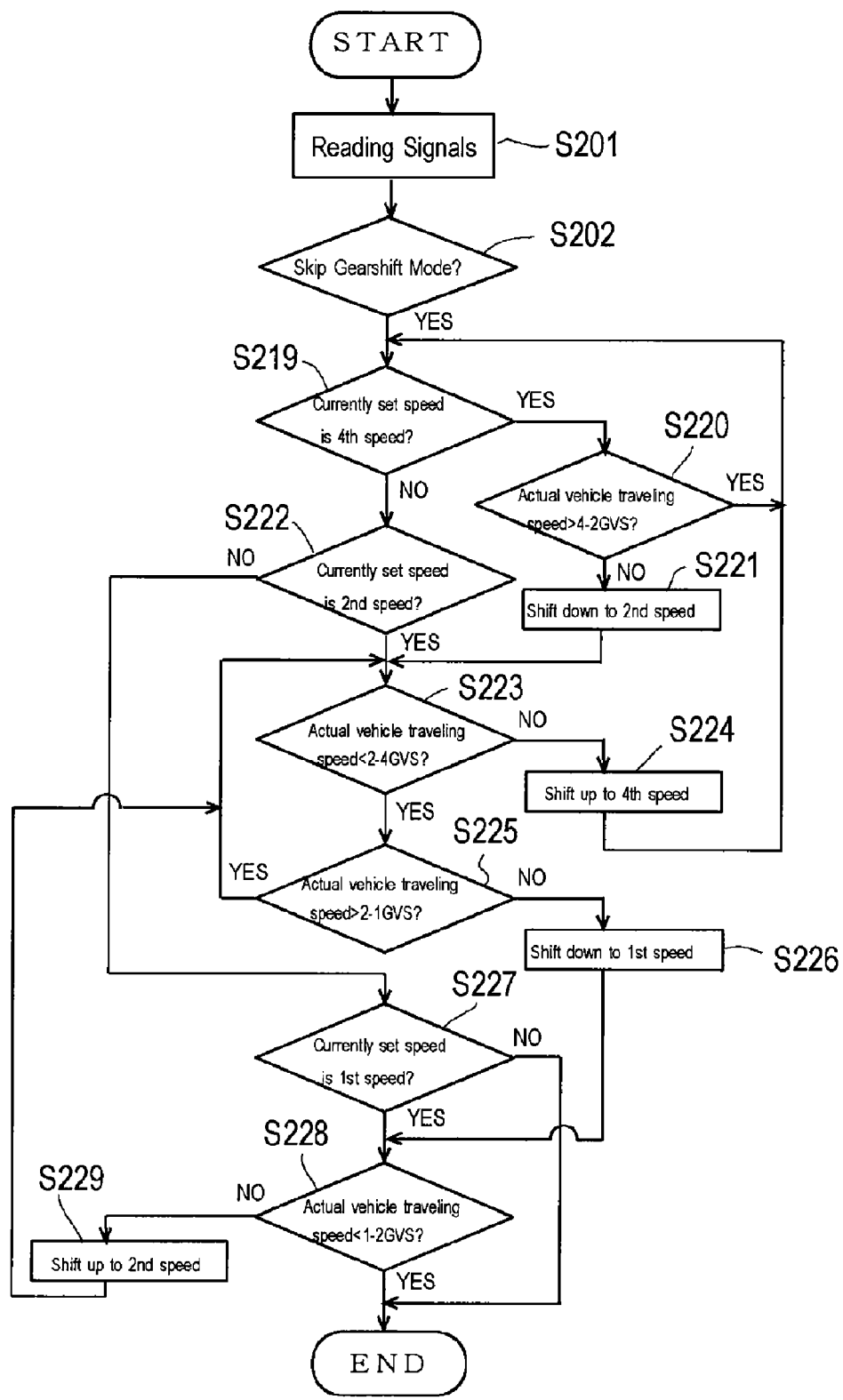
FIG. 20 is a flow chart of automatic gearshift of the dual clutch transmission set in the work traveling and skip gearshift mode.

Referring to FIG. 18, description will now be given of a control flow for selecting maps corresponding to respective modes selected by dial 175a and button 177a, and for changing the starting-and-stopping speed in the on-road traveling mode or the load-control traveling mode. At first, controller 90 decides the set position of dial 175a according to the signal from traveling mode switch 175 (step S10). When it is set at third speed rated traveling mode position 184, map 174 for automatic gearshift defining the third speed as the maximum speed in this mode (step S116). When it is set at second speed rated traveling mode position 185, map 175 for automatic gearshift defining the second speed as the maximum speed in this mode (step S117). When it is set at first speed rated traveling mode position 186, vehicle 1 travels at only the first speed (step S118).

Figure 13:
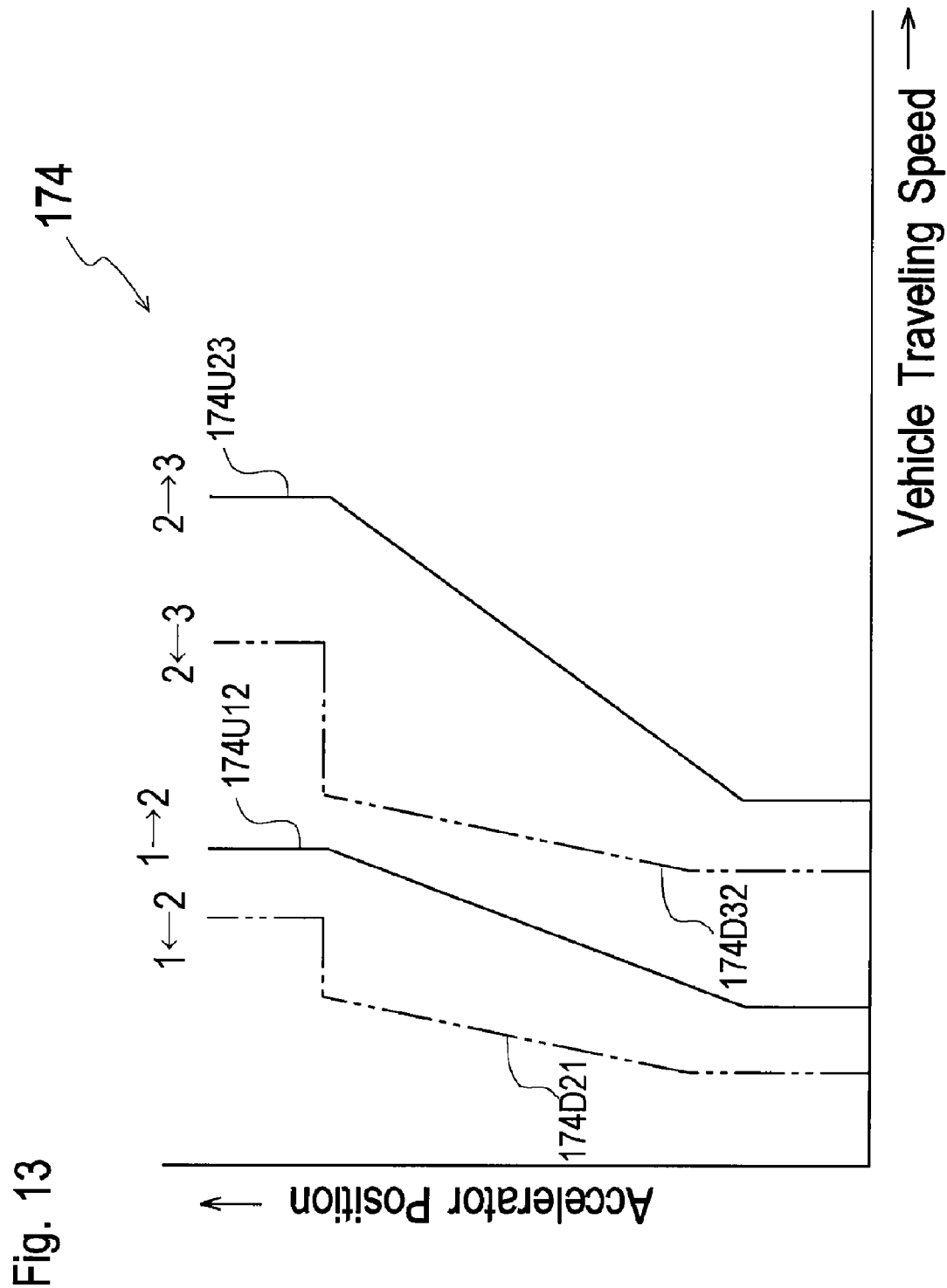
FIG. 13 is a correlation diagram as a gearshift point characteristic map for a third speed rated traveling mode.
Figure 14:
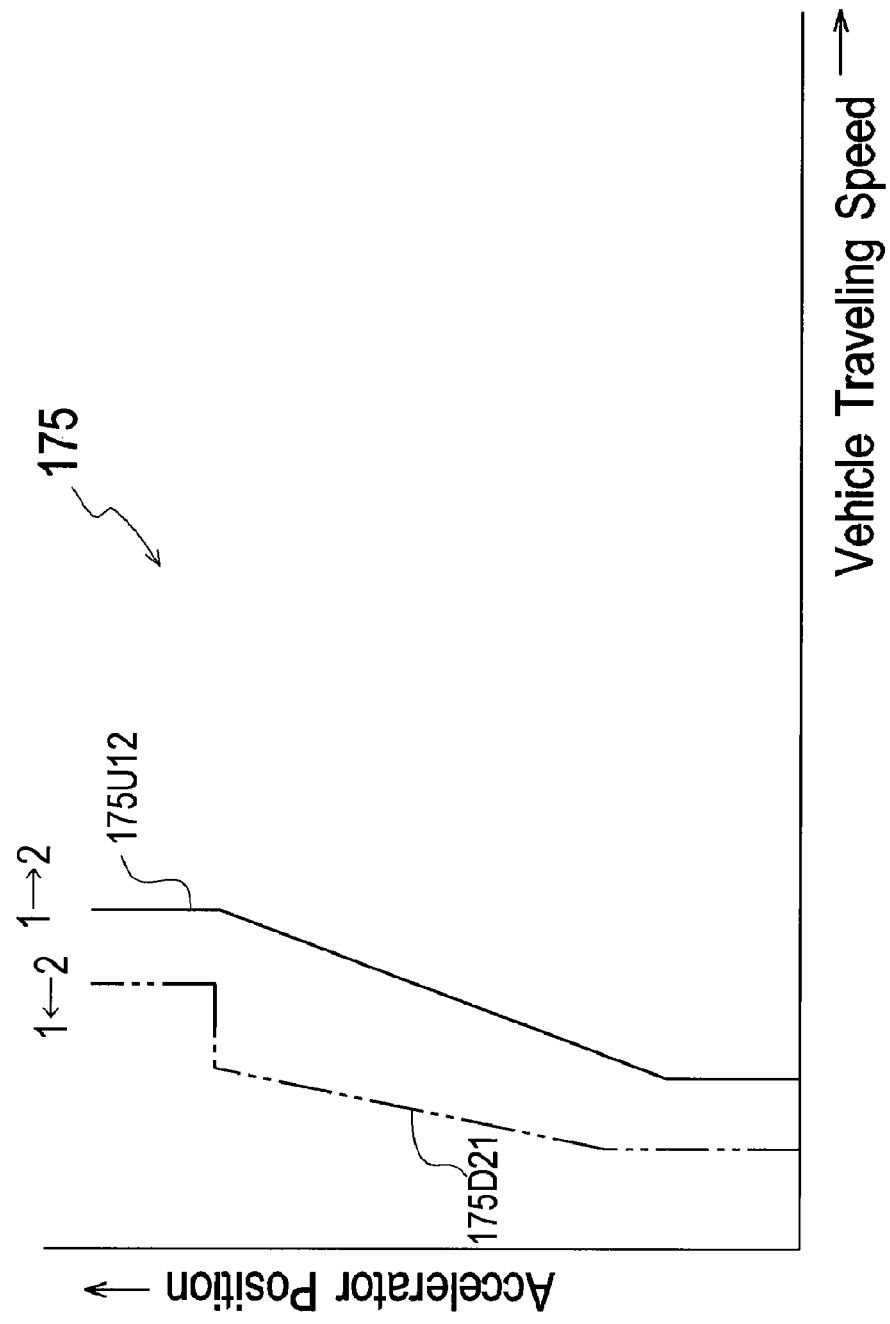
FIG. 14 is a correlation diagram as a gearshift point characteristic map for a second speed rated traveling mode.
Figure 15:
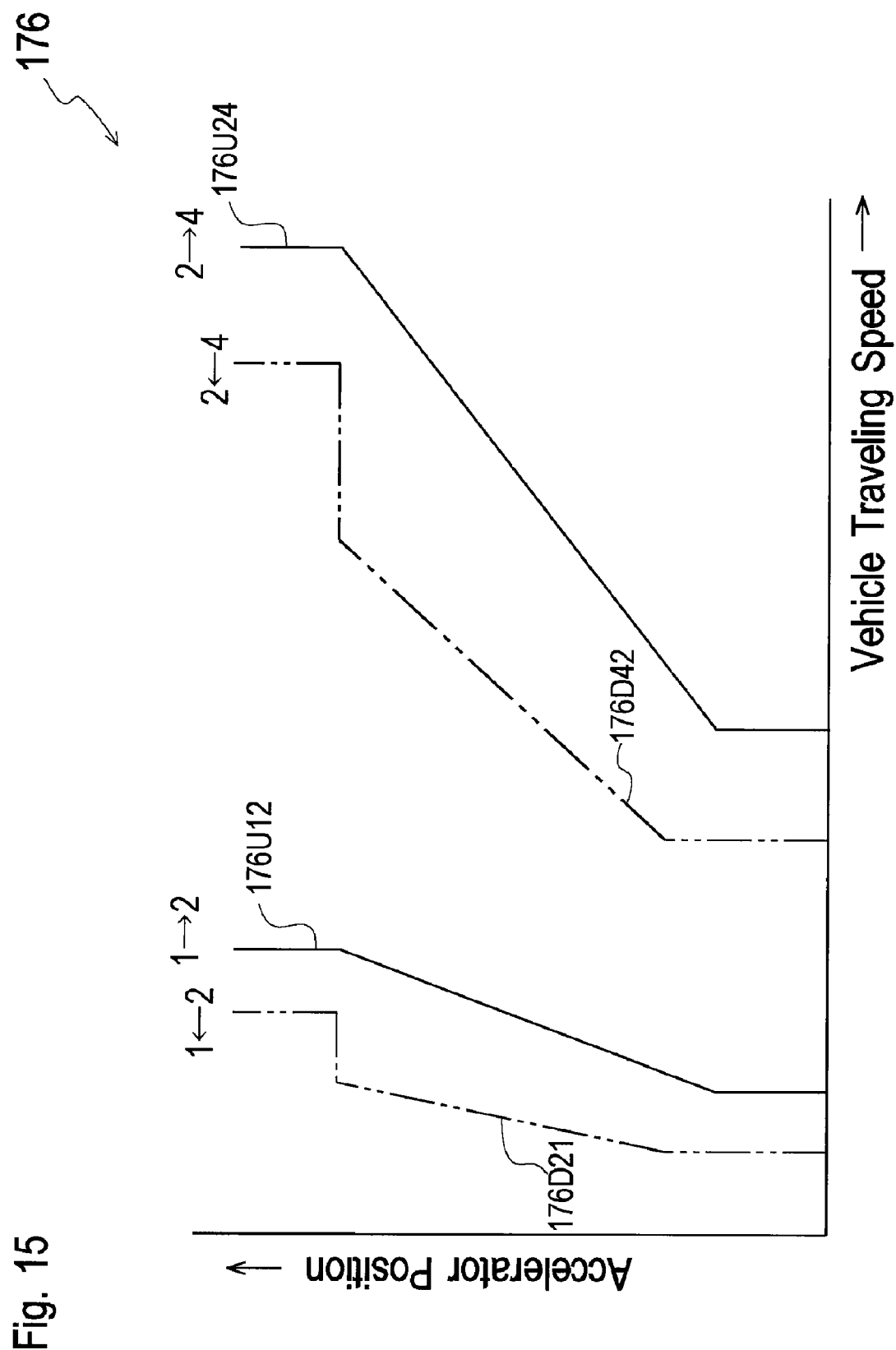
FIG. 15 is a correlation diagram as a gearshift point characteristic map for a work traveling and skip gearshift mode.
Figure 16:
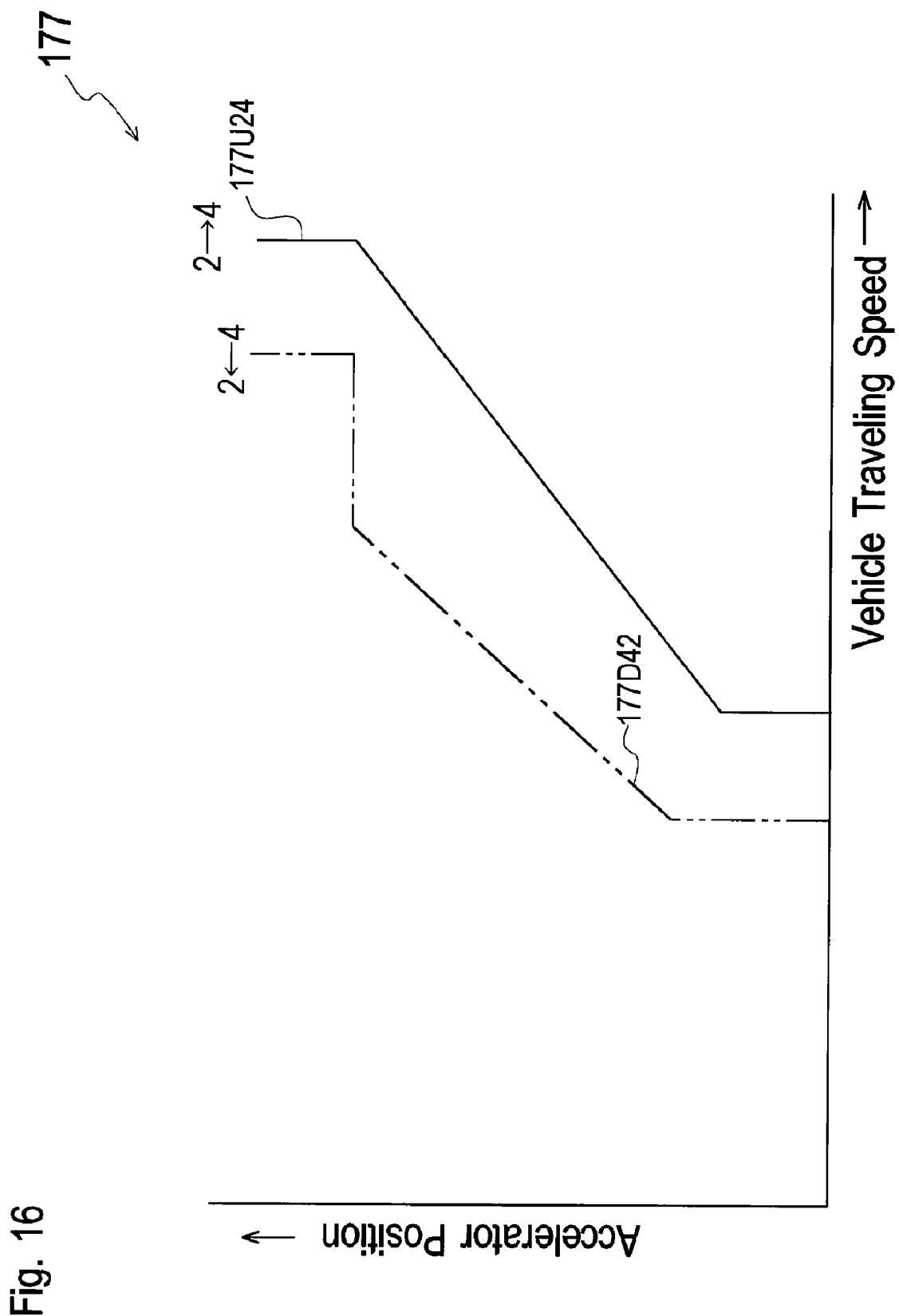
FIG. 16 is a correlation diagram as a gearshift point characteristic map for an on-road traveling and skip gearshift mode.
Figure 17:
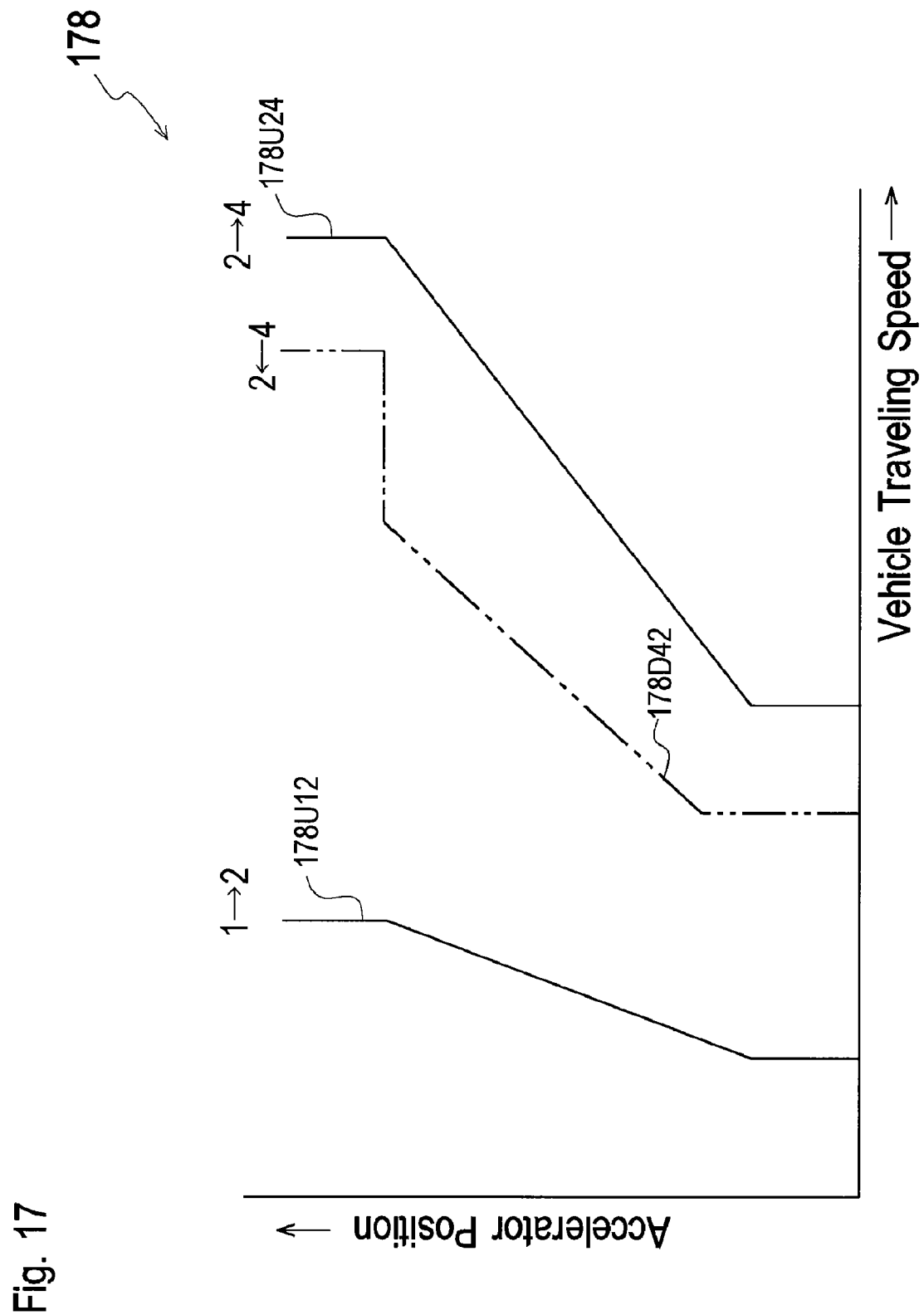
FIG. 17 is a correlation diagram as a gearshift point characteristic map for a load-control traveling and skip gearshift mode.

Map 174 of FIG. 13 for the third speed rated traveling mode consists of only lines 174U12 and 174D21 for gearshift between the first and second speeds and lines 174U23 and 174D32 for gearshift between the second and third speeds. This corresponds to map 171 of FIG. 10 for the work traveling and normal gearshift mode from which lines 171U34 and 171D43 for gearshift between the third and fourth speeds are deleted. Map 175 of FIG. 14 for the second speed rated traveling mode consists of only lines 175U12 and 175D21 for gearshift between the first and second speeds.

When dial 175a is set at any of work traveling mode position 182 (step S102, YES), on-road traveling mode position 181 (step S106, YES) and load-controlling traveling mode position 183 (step S106, NO), controller 90 decides whether button 177a is disposed at normal gearshift mode position 187 or skip gearshift mode position 188, according to the signal from skip gearshift switch 177 (step S103, S107 or S110). In the normal gearshift mode by setting button 177a at position 187, map 171 is selected for the work traveling mode (step S104), or map 173 is selected for either the on-road traveling mode or the load-control traveling mode (step S108 or S111). In the skip gearshift mode by setting button 177a at position 188, map 176 is selected for the work traveling mode (step S105), or map 177 is selected for either the on-road traveling mode or the load-control traveling mode (step S109 or S112).

In this embodiment, the third speed is determined to be skipped in the skip gearshift mode. In comparison with maps 171, 172 and 173 for the normal gearshift mode, each of maps 176, 177 and 178 for the skip gearshift mode includes none of lines corresponding to lines 171U23 and 171D32, or 172U23 and 172D32, or 173U23 and 173D32. Lines 176U24 and 176D42, lines 177U24 and 177D42, and lines 178U24 and 178D42 for gearshift between the second and fourth speeds correspond to lines 171U34 and 171D43 in map 171, lines 172U34 and 172D43 in map 172, and lines 173U34 and 173D43 in map 173 for gearshift between the third and fourth speeds, respectively.

Alternatively, for skipping the third speed, each of maps 176, 177 and 178 for the skip gearshift mode may include lines for gearshift the second and fourth speeds corresponding to lines 171U23 and 171D32 in map 171, lines 172U23 and 172D32 in map 172, or lines 173U23 and 173D32 in map 173 for gearshift between the second and third speeds, respectively, instead of lines corresponding to lines 171U34 and 171D43 in map 171, or 172U34 and 172D43 in map 172, or 173U34 and 173D43 in map 173 for gearshift between the third and fourth speeds. If the gearshift point line for shift up or down between the second and fourth speeds in the map for the skip gearshift mode corresponds to the gearshift point line for shift up or down between the second and third speeds in the map for the normal gearshift mode, the vehicle traveling speed range for the fourth speed traveling is expanded to the lower speed range. If the gearshift point line for shift up or down between the second and fourth speeds in the map for the skip gearshift mode corresponds to the gearshift point line for shift up or down between the third and fourth speeds in the map for the normal gearshift mode, the vehicle traveling speed range for the second speed traveling is expanded to the higher speed range. If the gearshift point line for shift up from the second speed to the third speed in the normal gearshift mode is provided as the gearshift point line for shift up from the second speed to the fourth speed, the gearshift point line for shift down from the third speed to the second speed is preferred to be provided as the gearshift point line for shift down from the fourth speed to the second speed, thereby preventing the excessively sensitive gearshift between the second and fourth speeds as mentioned above. If the gearshift point line for shift up from the third speed to the fourth speed in the normal gearshift mode is provided as the gearshift point line for shift up from the second speed to the fourth speed, either the gearshift point line for shift down from the third speed to the second speed or the gearshift point line for shift down from the fourth speed to the third speed may be provided as the gearshift point line for shift down from the fourth speed to the second speed so as to achieve the same purpose.

Regardless of whether the normal gearshift mode or the skip gearshift mode is set, in either the on-road traveling mode or the load-control traveling mode, the second speed is defined as the starting-and-stopping speed according to map 173 or 178. Controller 90 compares a tilt angle of vehicle 1 detected by tilt angle sensor 191 with a threshold (step S113). If the detected tilt angle exceeds the threshold, controller 90 decides vehicle 1 ascends a slope, and emergently determines the first speed as the starting-and-stopping speed (step S114). In the on-road traveling mode, if the detected tilt angle does not exceed the threshold, the second speed is kept to serve as the starting-and-stopping speed (step S117). In the load-control traveling mode, the second speed is kept to serve as the starting-and-stopping speed, however, it depends on the later-discussed judgment about the starting-and-stopping speed based on the detection of traveling load. Incidentally, the detection of tilt angle of vehicle 1 may be performed when vehicle 1 is stationary or during traveling of vehicle 1.

In the load-control traveling mode, a load on engine 5 of vehicle 1 during traveling (hereinafter, referred to as "traveling load") is detected and compared with a threshold (step S116). During the second speed traveling of vehicle 1, if the traveling load exceeds threshold, the starting-and-stopping speed is changed to the first speed (step S114). Otherwise, the second speed is kept to serve as the starting-and-stopping speed (step S117). This detected traveling load is defined as a relation of the acceleration position detection value to the vehicle traveling speed detection value. Existing accelerator position sensor 180 and engine rotary speed sensor 176 can be economically used for detecting these values. The accelerator position detection value can be replaced with the throttle opening detection value detected by throttle opening sensor 178. Alternatively, a torque sensor may be provided on the way of power train of dual clutch transmission 19.

The difference of map 173 from map 171 (or the difference of map 178 from map 176) is that map 173 (or 178) includes no gearshift line for shift down from the second speed to the first speed, because the shift down from the second speed to the first speed depends on the detection of traveling load or the detection of vehicle tilt angle, and it is not judged according to the correlation between the accelerator position and the vehicle traveling speed. However, in the map, a gearshift point line 173U12 (or 178U12) for shift up from the first speed to the second speed is provided so as to automatically shift up the first speed to the second speed after the emergent shift down from the second speed to the first speed. In addition, in map 173, gearshift point lines 173U23 and 173U34 for shift up and gearshift lines 173D43 and 173D32 for shift down are the same correlation graphs as respective lines 171U23, 171D34, 171D43 and 171D32.

Incidentally, as mentioned above, map 173 or 178 is used for the on-road traveling mode. However, if the above-mentioned emergent shift down to the first speed based on the detection of vehicle tilt angle is not realized, on-road traveling and normal gearshift map 172 including only gearshift point lines 172U23 and 172D32 between the second and third speeds and gearshift point lines 172U34 and 172D43 between the third and fourth speeds may be used, or on-road traveling and skip gearshift map 177 including only gearshift point lines 177U24 and 177D42 between the second and fourth speeds may be used To clear the difference between the normal gearshift speed and the skip gearshift mode, description will now be given of the automatic gearshift control shown in FIG. 19 based on map 171 for the work traveling and normal gearshift mode, and the automatic gearshift control shown in FIG. 20 based on map 176 for the work traveling and skip gearshift mode. In this regard, the later-discussed comparison of the actual vehicle traveling speed with each GVS as a vehicle traveling point on each gearshift point line is based on the assumption with the accelerator position (throttle opening) is kept constant.

Controller 90 reads a mode signal from skip gearshift mode switch 177, detection signals for deciding a speed of dual clutch transmission 19, i.e., the accelerator position signal from accelerator position sensor 180 and the output rotary speed signal from vehicle traveling speed sensor 179, and a currently set speed of dual clutch transmission 19. In the work traveling mode, when the normal gearshift mode is set by setting button 177a at normal gearshift mode position 187 (step S202, NO), the automatic selection of speed of dual clutch transmission 19 is performed as follows:

When the currently set speed is the fourth speed (step S203, YES), the actual vehicle traveling speed is compared with a gearshift-threshold vehicle traveling speed (hereinafter, "4-3GVS") on a gearshift point line 171D43 for shift down from the fourth speed to the third speed (step S204). While the actual vehicle traveling speed exceeds the 4-3GVS (step S204, YES), the fourth speed is kept. When the currently set speed is the fourth speed, and when it is found that the actual vehicle traveling is not more than the 4-3GVS (step S204, NO), the fourth speed is shifted down to the third speed (step S205).

When the currently set speed is the third speed, the actual vehicle traveling speed is compared with a gearshift-threshold vehicle traveling speed (hereinafter, "3-4GVS") on a gearshift point line 171U34 for shift up from the third speed to the fourth speed (step S207), and with a gearshift-threshold vehicle traveling speed (hereinafter, "3-2GVS") on a gearshift point line 171D32 for shift down from the third speed to the second speed (step S209). When the actual vehicle traveling speed is not less than the 3-4GVS (step S207, NO), the third speed is shifted up to the fourth speed (step S208). When the actual vehicle traveling speed is not more than the 3-2GVS (step S209, NO), the third speed is shifted down to the second speed (step S210).

When the currently set speed is the second speed, the actual vehicle traveling speed is compared with a gearshift-threshold vehicle traveling speed (hereinafter, "2-3GVS") on a gearshift point line 171U23 for shift up from the second speed to the third speed (step S212), and with a gearshift-threshold vehicle traveling speed (hereinafter, "2-1 GVS") on a gearshift point line 171D21 for shift down from the second speed to the first speed (step S214). When the actual vehicle traveling speed is not less than the 2-3GVS (step S212, NO), the second speed is shifted up to the third speed (step S213). When the actual vehicle traveling speed is not more than the 2-1GVS (step S214, NO), the second speed is shifted down to the first speed (step S215).

When the currently set speed is the first speed, the actual vehicle traveling speed is compared with a gearshift-threshold vehicle traveling speed (hereinafter, "1-2GVS") on a gearshift point line 171U12 for shift up from the first speed to the second speed. When the actual vehicle traveling speed is not less than the 1-2GVS (step S217, NO), the first speed is shifted up to the second speed (step S218).

When the skip gearshift mode is set by setting button 177a at skip gearshift mode position 188 (step S202, YES), the automatic selection of speed of dual clutch transmission 19 is performed as follows. Incidentally, as mentioned above, the third speed is predetermined as the speed skipped in the skip gearshift mode, and gearshift point lines 171U34 and 171D43 for shift up and down between third and fourth speeds in the normal gearshift mode are used as gearshift point lines 176U24 and 176D42 for shift up and down between the second and fourth speeds.

When the currently set speed is the fourth speed (step S219, YES), the actual vehicle speed is compared with a gearshift-threshold vehicle traveling speed (hereinafter, "4-2GVS") on gearshift point line 176D42 for shift down from the fourth speed to the second speed (step S220). The fourth speed is kept while the actual vehicle traveling speed exceeds the 4-3GVS (step S220, YES), and the fourth speed is shifted down to the second speed (step S221) when the actual traveling speed is not more than the 4-3GVS (step S220, NO).

When the currently set speed is the second speed, the actual vehicle traveling speed is compared with a gearshift-threshold vehicle traveling speed (hereinafter, "2-4GVS") on gearshift point line 176U24 for shift up from the second speed to the fourth speed (step S223), and with the 2-1GVS on line 176D21 (step S226). The second speed is shifted up to the fourth speed (step S224) when the actual vehicle traveling speed is not less than the 2-4GVS (step S223, NO), and the second speed is shifted down to the first speed (step S226) when the actual vehicle traveling speed is not more than the 2-1 GVS (step S225, NO). When the currently set speed is the first speed (step S227, YES), the actual vehicle traveling speed is compared with the 1-2GVS on line 176U12 (step S228). When the actual vehicle traveling speed is not less than the 1-2GVS (step S228, NO), the first speed is shifted up to the second speed (step S229).

The skip gearshift mode may be realized in the mode such as the above-mentioned third speed rated traveling mode where the maximum speed is manually determined, if possible. When there is a part where the skip gearshift is contradictory to another set mode, whichever may have priority to the other. The same thing is said for the case where the skip gearshift mode is adapted together with the later-discussed gearshift controls for braking, for climbing a slope, and for reversing.

An automatic gearshift control when applying a brake will be described with reference to FIGS. 21 and 22. When a brake is applied during traveling of vehicle 1, the vehicle traveling speed is reduced and the set speed is shifted down to the starting-and-stopping by the automatic gearshift control according to map 171 of FIG. 10, for example, for example. However, when the brake is very sudden and rapid, the shift down of set speed cannot follow the reduction of vehicle traveling speed, thereby resulting in slow traveling of vehicle 1 while setting a high speed, causing an engine stalling. Therefore, according to a configure shown in FIG. 21 and a control flow of FIG. 22, the set speed of dual clutch transmission 19 is automatically changed to an appropriate speed corresponding to a force of the brake and the actual vehicle traveling speed, thereby preventing the engine stalling caused by the sudden and rapid brake.

Figure 21:
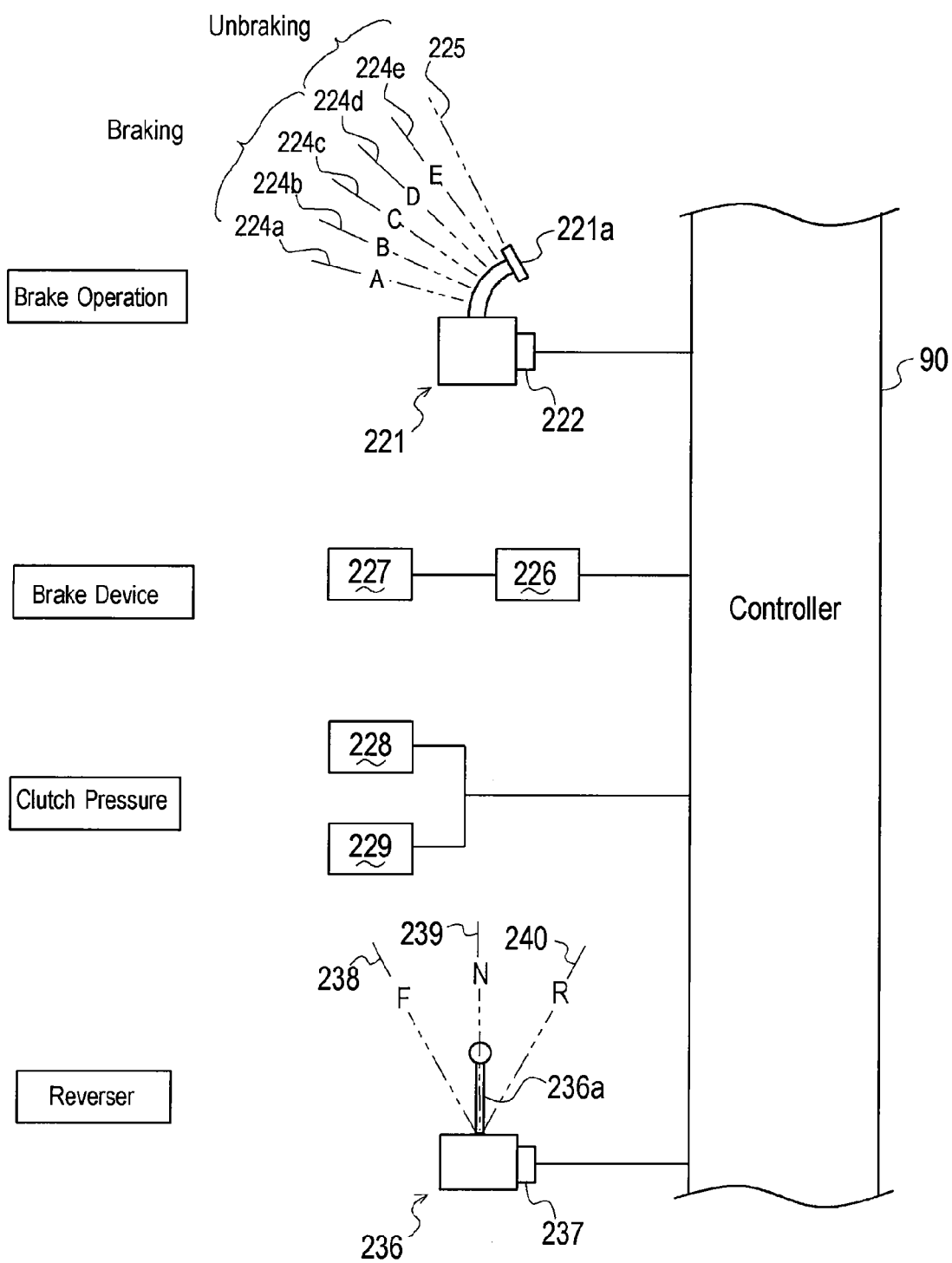
FIG. 21 is a block diagram of a part of the automatic speed control system for braking a traveling vehicle, for controlling the clutches for speed changing in changing the forward/backward traveling direction, and for the clutches for starting a vehicle on a slope.

In this regard, as shown in FIG. 21, vehicle 1 is provided with a brake device 227 for braking its wheels 26 or 37 on any intermediate position on the power train from engine 5 to wheels 26 or 37. Vehicle 1 is also provided with a brake operation device 221 including a brake pedal 221a and a brake pedal sensor 222, such as a potentiometer, for detecting a position of brake pedal 221a. Controller 90 is electrically connected to brake pedal sensor 222, and to an electromagnetic switching valve 226 for controlling an actuator for brake device 227. Brake pedal sensor 222 detects which of depression positions 224a, 224b, 224c, 224d, 224e and 225 brake pedal 221a is disposed at, and issues a brake pedal position signal corresponding to detected position 224a, 224b, 224c, 224*d*, 224*e* or 225 to controller 90. Controller 90 issues a brake command signal corresponding to the detected position of brake pedal 221*a*, so as to activate brake device 227 for braking or unbraking. Instead of such an electric brake control with controller 90, brake pedal 221*a* may be mechanically connected to a piston rod of a hydraulic cylinder for controlling hydraulic brake device 227, so that brake device 227 is activated by hydraulic pressure controlled by movement of the piston of the hydraulic cylinder according to the depression of brake pedal 221*a*.

Brake pedal depressions (hereinafter, simply referred to as "depressions") A, B, C, D and E referred to in FIG. 22 correspond to respective depressed brake pedal positions 224*a*, 224*b* 224*c*, 224*d*. The braking force applied by brake device 227 is reduced as maximum depression A is reduced to depression D through depressions B and C. When brake pedal 221*a* is disposed at minimum depression E or undepressed position 225, the braking force applied by brake device 227 is zero, i.e., brake device 227 is set for unbraking.

Figure 22:
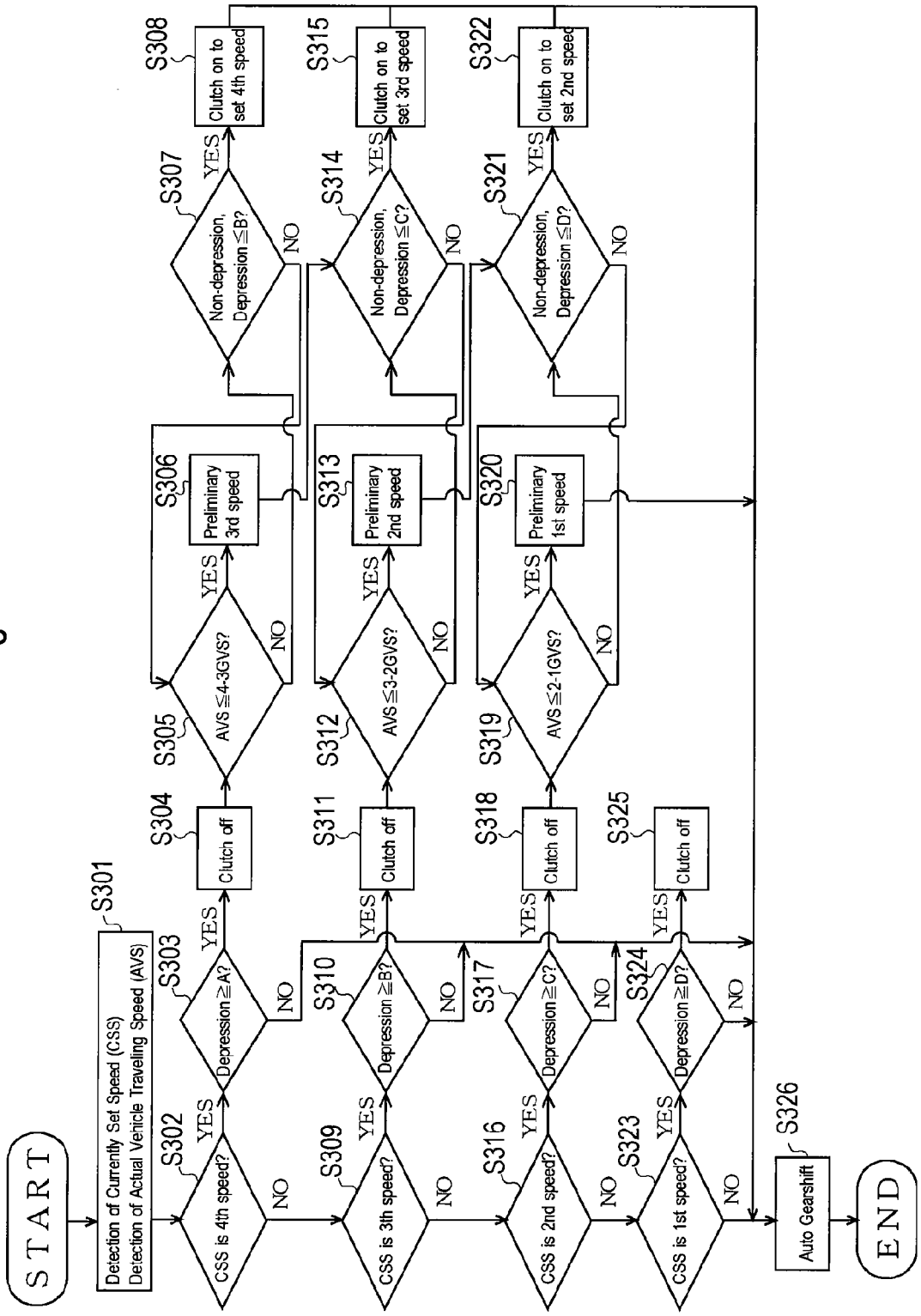
FIG. 22 is a flow chart for braking a traveling vehicle.

Due to the above-mentioned configuration, the automatic gearshift control for braking is performed according to the flow of FIG. 22. The currently set speed (step S301) and the pedal position signal from brake pedal sensor 222 are detected, and based on these detection signals, controller 90 controls first and second clutches 58 and 59 as follows.

When the currently set speed is the fourth speed (step S302, YES) and brake pedal 221*a* is disposed at the depth shallower than depression A (step S303, NO), the fourth speed is normally shifted down to the starting-and-stopping speed step one speed by one speed without intermittence of power transmission as the vehicle traveling speed is reduced (step S326).

When the currently set speed is the fourth speed (step S302, YES) and brake pedal 221*a* is depressed to the depth equal to or deeper than depression A (step S303, YES), controller 90 recognizes that the brake is too rapid for the four speed traveling, and issues a clutch control command signal to clutch-controlling valve group 189 so as to disengage engaged second clutch 59, i.e., to disengage both clutches 58 and 59 (step S304), thereby cutting off the power transmitted to transmission output shaft 54.

After second clutch 59 is disengaged, controller 90 compares the actual vehicle speed with the 4-3GVS (step S305). When the actual vehicle speed does not exceed the 4-3GVS (step S305, YES), controller 90 commands shifter-controlling valve group 190 to select the third speed gear train to be driven (to engage the third speed forward traveling clutch) while both first and second clutches 58 and 59 are disengaged. This driving selection state of the third speed gear train before engaging first clutch 58 is referred to as a "preliminary third speed" state (step S306). The similar reference is adapted for the later-discussed first and second speeds. On the contrary, when the reduced actual vehicle traveling speed still exceeds the 4-3GVS (step S305, NO), the brake pedal depression is detected again. When the depression of brake pedal 221*a* is not deeper than depression B (step S307, YES), controller 90 recognizes that the brake bas been released or comes to a gentle level requiring no cutting-off of power transmission for the fourth speed traveling, and controller 90 commands clutch-controlling valve group 189 to engage second clutch 59 again, thereby resetting the fourth speed (step S308). On the contrary, when the depression of brake pedal 221*a* exceeds depression B (step S307, NO), controller 90 recognizes that the brake level is still rapid for the fourth speed traveling, and compares the actual vehicle traveling speed with the 4-3GVS again (step S305).

When the currently set speed is the third speed (step S309, YES), or in the preliminary third speed state, controller 90 compares the brake pedal depression with depression B (step S310). When the depression of brake pedal 221*a* is shallower than depression B (step S310, NO), the currently set third speed is kept, or first clutch 58 is engaged to change the preliminary third speed state to the real third speed traveling state (step S326). On the contrary, when the depression of brake pedal 221*a* is not shallower than depression B (step S310, YES), controller 90 recognizes that the brake level is too rapid for the third speed traveling, and disengages first clutch 58, or keeps the disengagement of first clutch 58 (step S311).

After first clutch 58 is disengaged, controller 90 compares the actual vehicle traveling speed with the 3-2GVS (step S312). When the actual vehicle traveling speed does not exceed the 3-2GVS (step S312, YES), the second speed gear train is selected to be driven (i.e., the second speed forward traveling clutch is engaged) while disengaging second clutch 59, thereby realizing a "preliminary second speed" state (step S313). When the reduced actual vehicle traveling speed still exceeds the 3-2GVS (step S312, NO), the brake pedal depression is detected again. When the depression of brake pedal 221*a* is not deeper than depression C (step S314, YES), first clutch 58 is engaged again so as to reset the third speed (step S315). On the contrary, when the depression of brake pedal 221*a* is deeper than depression C (step S314, NO), the actual vehicle traveling speed is compared with the 3-2GVS again (step S312).

When the currently set speed is the second speed (step S316, YES), or in the preliminary second speed state, controller 90 compares the brake pedal depression with depression C (step S317). When the depression of brake pedal 221*a* is shallower than depression C (step S317, NO), the currently set second speed is kept, or second clutch 59 is engaged to change the preliminary second speed state to the real second speed traveling state (step S326). On the contrary, when the depression of brake pedal 221*a* is not shallower than depression C (step S317, YES), controller 90 recognizes that the brake level is too rapid for the second speed traveling, and disengages second clutch 59, or keeps the disengagement of second clutch 59 (step 318).

After second clutch 59 is disengaged, controller 90 compares the actual vehicle traveling speed with the 2-1GVS (step S319). When the actual vehicle traveling speed does not exceed the 2-1GVS (step S319, YES), the first speed gear train is selected to be driven (i.e., the first speed forward traveling clutch is engaged) while disengaging first clutch 58, thereby realizing a "preliminary first speed" state (step S320). When the reduced actual vehicle traveling speed still exceeds the 2-1GVS (step S319, NO), the brake pedal depression is detected again. When the depression of brake pedal 221*a* is not deeper than depression D (step S321, YES), second clutch 59 is engaged again so as to reset the second speed (step S322). On the contrary, when the depression of brake pedal 221*a* is deeper than depression D step S321, NO), the actual vehicle traveling speed is compared with the 2-1GVS again (step S319).

When the currently set speed is the first speed (step S323, YES), or in the preliminary first speed state, controller 90 compares the brake pedal depression with depression D (step S324). When the depression of brake pedal 221*a* is shallower than depression D (step S324, NO), the currently set first speed is kept, or first clutch 58 is engaged to change the preliminary first speed state to the real first speed traveling state (step S326). On the contrary, when the depression of brake pedal 221*a* is not shallower than depression D (step S324, YES), controller 90 recognizes that the brake level is too rapid for the first speed traveling, and disengages first clutch 58, or keeps the disengagement of first clutch 59 (step S325). In other words, unless brake pedal 221a is disposed shallower than depression D, it results that vehicle 1 stops at the first speed (on the assumption that the first speed is defined as the starting-and-stopping speed) while both clutches 58 and 59 are disengaged.

As mentioned above, during a braking operation, the brake operation degree, the actual vehicle traveling speed and the currently set speed are detected, and when the brake is excessively rapid, both clutches 58 and 59 are disengaged so as to cut off the power transmitted to transmission output shaft 54, thereby preventing the engine stalling or other problems caused by a rapid brake. When the brake is not excessively rapid, dual clutch transmission 19 is shifted down during the braking operation without cutting-off of the power transmission so as to prevent the excessively frequent use of brake device 227 causing problems such as vapor locking, and so as to prolong the life of brake device 227, thereby reducing the running costs. When the reduced actual vehicle traveling speed reaches a GVS for shift down or becomes less than the GVS, the preliminary state of the lower speed of dual clutch transmission 19, where the lower speed gear train is selected to be driven while both clutches 58 and 59 are disengaged, is realized. If the vehicle traveling speed considering the brake state is suit to the selected speed to be driven, the first or second clutch 58 or 59 is engaged to start the traveling of vehicle 1 at this speed, thereby preventing a delay of engine brake after the brake is released from its excessively rapid state, and thereby improving the traveling feeling of vehicle 1.

Figure 23:
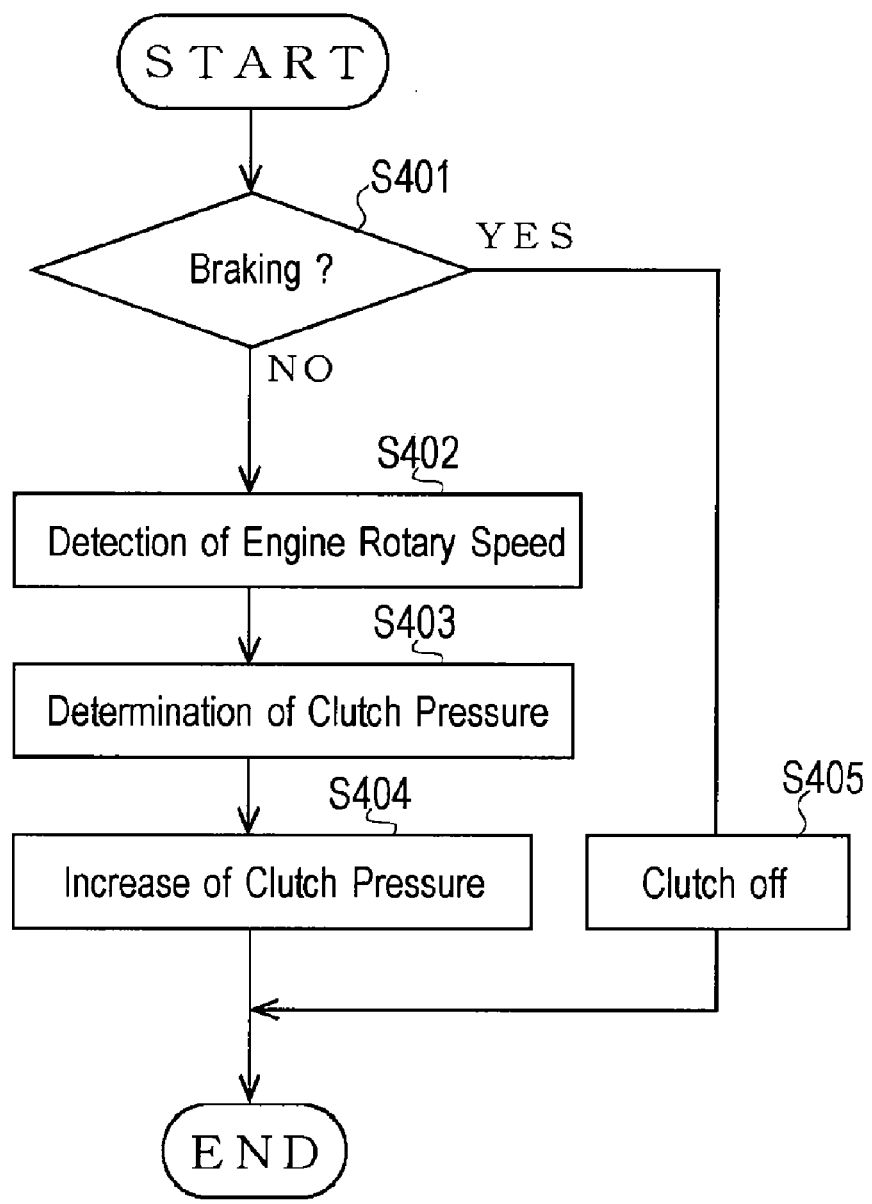
FIG. 23 is a flow chart for controlling the clutches for starting a vehicle on a slope.

A hydraulic clutch pressure of clutches 58 and 59 on starting of vehicle 1 to ascend a slope will be described with reference to FIGS. 21, 23 and 24. In this regard, to start vehicle 1 for ascending a slope, brake device 227 and a (not shown) parking brake are operated for unbraking, and then, the hydraulic clutch pressure of disengaged clutch 58 or 59 is increased to engage this clutch, whereby vehicle 1 starts ascending the slope by the driving power created by a set speed serving as the starting-and-stopping speed. However, before starting of vehicle 1, a brake is not applied. It may result in short of torque of starting vehicle 1 by engaging the clutch before the increased engine rotary speed reaches a sufficient value, thereby causing a roll back of vehicle 1, i.e., unexpected descending of vehicle 1, if vehicle 1 is heavily weighed by heavy load or if the slope is steep. Therefore, a configuration shown in FIG. 21 and an automatic clutch control process shown in FIGS. 23 and 24 are provided for preventing the roll back of vehicle 1 starting to ascend a slope.

For this clutch pressure control, as shown in FIG. 21, controller 90 is electrically connected to a first clutch pressure sensor 228 for detecting the hydraulic clutch pressure of first clutch 58, and to a second clutch pressure sensor 229 for second clutch 59. Each of sensors 228 and 229 converts the detected hydraulic clutch pressure into a clutch pressure signal, and transmits the signal to controller 90.

The clutch control according to the flow chart of FIG. 23 by using sensors 228 and 229 will be described. The depression of brake pedal 221a is detected, and when brake pedal 221a is depressed to one of depressions A, B, C and D, i.e., when brake device 227 is activated for braking (step S401, YES), controller 90 commands clutch-controlling valve group 189 to keep the disengagement of both clutches 58 and 59 (step S405), thereby keeping vehicle 1 stationary.

Figure 24:
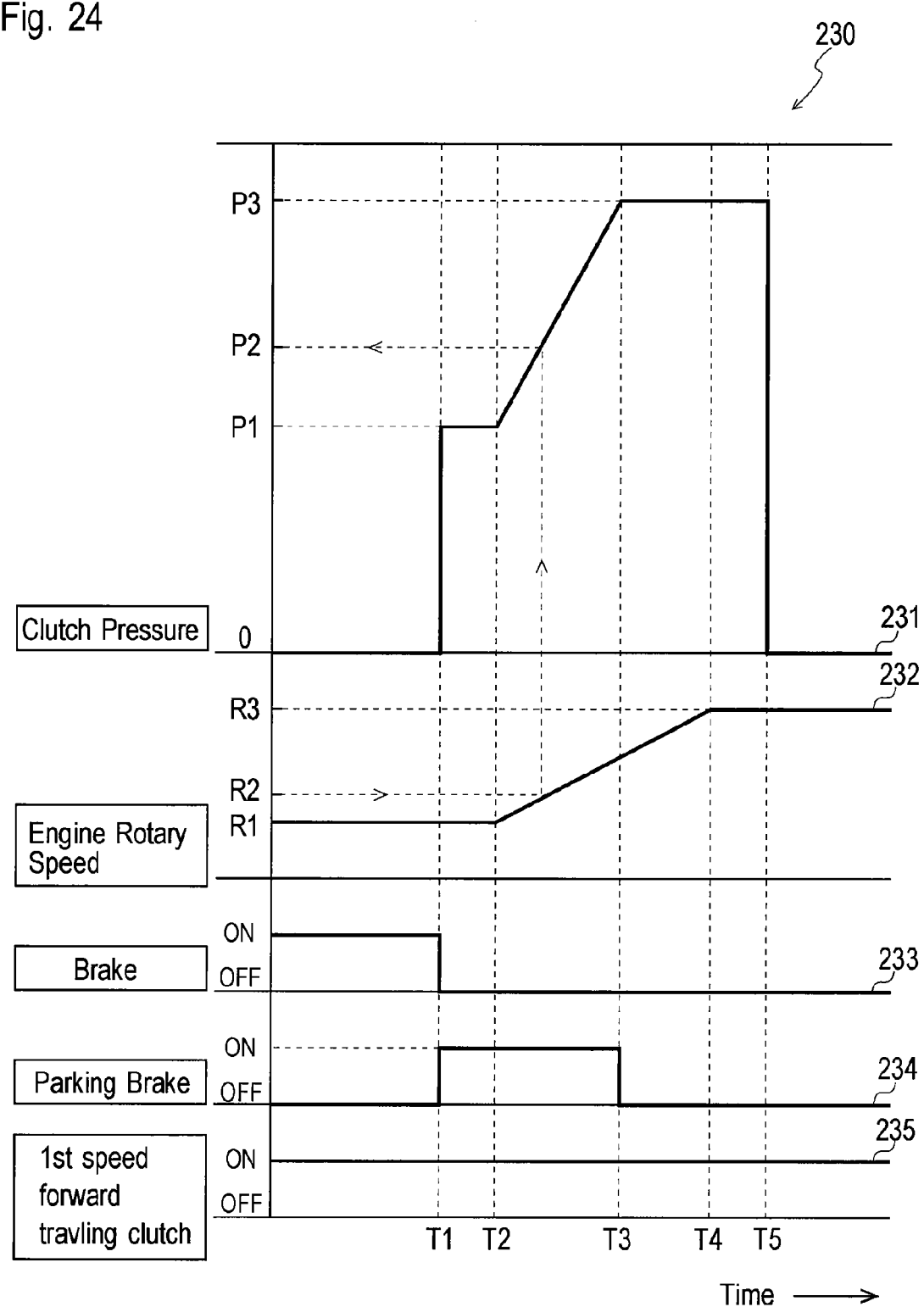
FIG. 24 is a time chart of starting of a vehicle on a slope based on detection of an engine rotary speed.

When brake pedal 221a is disposed at slight depression E or at undepressed position 225, i.e., when brake device 227 is set for unbraking (step S401, NO), the rotary speed of engine 5 is detected by engine rotary speed sensor 176 (step S402), and a clutch pressure corresponding to the detected engine rotary speed is determined according to a map 230 of FIG. 24 (step S403), and then, controller 90 commands clutch-controlling valve group 189 to increase the hydraulic clutch pressure of either clutch 58 or 59 to be engaged aiming at the determined clutch pressure (step S404) so as to drive the starting-and-stopping speed gear train.

With regard to the determination of clutch pressure, in map 230, graphs 231, 232, 233, 234 and 235 indicate simultaneous changes of respective values during a time passage for starting vehicle 1. Graph 231 indicates a variation of clutch pressure, and graph 232 indicates a variation of engine rotary speed. For example, the clutch pressure corresponding to an engine rotary speed R2 as a point on graph 232 is a clutch pressure P2 as a point on graph 231.

Further, graph 233 indicates a variation of electric element value (e.g., voltage) designating whether brake device 227 is set for braking or unbraking, graph 234 indicates a variation of electric element value (e.g., voltage) designating whether the parking brake is set for braking or unbraking, and graph 235 indicates a variation of electric element value (e.g., voltage) designating whether the starting-and-stopping speed (in this embodiment, first speed) forward traveling clutch is engaged or not. During the time passage for starting vehicle 1, the first speed is constantly selected to be driven, i.e., the first speed forward traveling clutch is constantly engaged.

Originally, the engine rotary speed is a rotary speed R1 for idling engine 5, and brake device 227 is set for braking. At a timing T1, depressed brake pedal 221a is released so as to change brake device 227 having been set for braking into the state for unbraking, and simultaneously, disengaged clutch 58 or 59 for the starting-and-stopping speed (in this embodiment, first clutch 58 for the first speed) is supplied with a hydraulic clutch pressure P1 for half-clutching, and the parking brake having been released is automatically or manually set for braking.

At a timing T2 after timing T1, the accelerator pedal is depressed so as to start the increase of the engine rotary speed from idling rotary speed R1. Afterward, as the engine rotary speed increases, the clutch pressure of clutch 58 to be engaged is increased from P1 by the hydraulic pressure control according to graphs 231 and 232 in map 230. At a timing T3 on the way of increase of the engine rotary seed, the increased clutch pressure reaches a maximum clutch pressure P3, i.e., clutch 58 is completely engaged, and simultaneously, the applied parking brake is released automatically or manually. For the time between timings T2 and T3, the hydraulic clutch pressure of clutch 58 (e.g., clutch pressure P2 between clutch pressures P1 and P3) determined to correspond to the increased engine rotary speed (e.g., engine rotary speed R2 between engine rotary speeds R1 and R3) is a value for half-engaging clutch 58 so as to enable vehicle 1 to climb a slope. Afterward, while hydraulic clutch pressure P3 is constant, the engine rotary speed is further increased until it reaches a maximum rotary speed R3 at a timing T4.

The gearshift control for reversing the forward/backward traveling direction during traveling, and for re-driving during traveling are described with reference to FIGS. 21, 25, 26 and 27. In this regard, as shown in FIG. 21, vehicle 1 is provided with a reverser operation device 236, including a reverser lever 236a and a reverser lever sensor 237 for detecting the position of reverser lever 236a. Reverser lever 236a is shiftable between a forward traveling position 238 and a backward traveling position 240 through a neutral position 239. Controller 90 is electrically connected to reverser lever sensor 237. Reverser lever sensor 237 detects at which position reverser lever 236a is set among forward traveling position 238, neutral position 239 and backward traveling position 240, and transmits a reverser lever position signal corresponding to the position of reverser lever 236a to controller 90. Controller 90 commands valve groups 189 and 190 to correspond to the reverser lever position signal.

Figure 25:
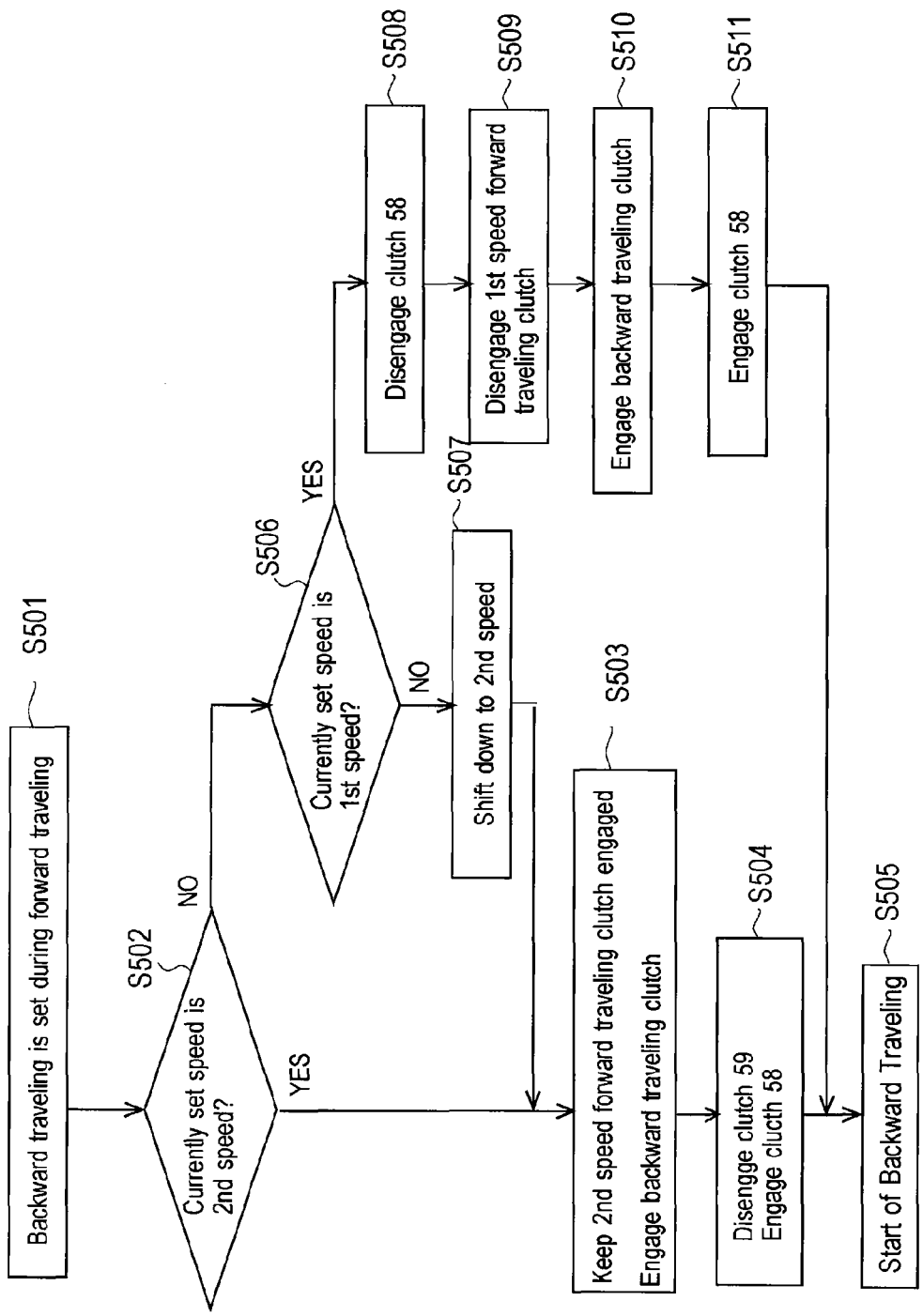
FIG. 25 is a flow chart of gearshift of the dual clutch transmission when setting for backward traveling during forward traveling of the vehicle.

Referring to a flow chart of FIG. 25, description will now be given of a gearshift pattern (how to changing the clutches) in the situation where reverser lever 236a set at forward traveling position 238 is shifted to backward traveling position 240 during forward traveling of vehicle 1, that is, the backward traveling is set during forward traveling. Incidentally, reverser lever 236a shifted between forward traveling position 238 and backward traveling position 240 must pass through neutral position 239. However, this situation is assumed so that lever 236a momentarily passes through neutral position 239, i.e., the movement of lever 236a shifted from forward traveling position 238 to backward traveling position 240 is very quick. The same thing is adapted for the later-discussed situation referring to FIG. 26, where the forward traveling is set during backward traveling, i.e., reverser lever 236a set at backward traveling 240 is shifted to forward traveling position 238 during backward traveling of vehicle.

In the above-mentioned configuration of dual clutch transmission 19, the backward traveling gear train as well as the odd-numbered speed (i.e., the first and third speed) forward traveling gear trains are to be driven by engaging first clutch 58. On the other hand, the second speed forward traveling gear train belongs to the even-numbered speed forward traveling gear trains to be driven by engaging second clutch 59. Consequently, it is suggested that the simultaneous shift of first and second clutches 58 and 59 where one of clutches 58 and 59 is engaged and the other clutch 59 or 58 is disengaged is adaptable for the gearshift between the second speed forward traveling and the backward traveling. Further, the second speed forward traveling provides a sufficient torque for stopping forward traveling vehicle 1 to be driven backward.

From this viewpoint, when reverser lever 236a is shifted to backward traveling position 240 during backward traveling of vehicle 1 (step S501) and the currently set speed is the second speed (step S502, YES), the backward traveling clutch is engaged while the engagement of the second speed forward traveling clutch is kept (step S503). When the vehicle traveling speed is sufficiently reduced, second clutch 59 is disengaged and first clutch 58 is engaged (step S504), thereby starting vehicle 1 for backward traveling (step S505). When reverser lever 236a is shifted to backward traveling position 240 during backward traveling of vehicle 1 (step S501) and the currently set speed is the third or fourth speed (step S506, NO), the set speed is shifted to the second speed. In this regard, if the currently set speed is the fourth speed, the fourth speed is shifted down to the third speed, and then, the third speed is shifted down to the second speed. After the second speed is set by the shift down, the process of steps S503 and 504 are performed so as to start vehicle 1 for backward traveling (step S505). In this way, the gearshift between the second speed forward traveling and the backward traveling can be subjected to the half-clutched process.

If the currently set speed when lever 236a reaching backward traveling position 240 is the first speed (step S505, NO), first clutch 58 is engaged while second clutch 59 has already been disengaged (step S508) because the first speed forward traveling gear train as well as the backward traveling gear train are to be driven by engaging first clutch 58. Then, the first speed forward traveling clutch is disengaged (step S509), subsequently, the backward traveling clutch is engaged (step S510), and finally, first clutch 58 is engaged (step S511), thereby starting vehicle 1 for backward traveling (step S505). In this way, for the gearshift from the first speed forward traveling to the backward traveling, both first and second clutches 58 and 59 are completely disengaged so as to realize a neutral state before starting the backward traveling of vehicle 1. Incidentally, if the second speed forward traveling after the backward traveling is anticipated, the second speed forward traveling clutch may be engaged simultaneously with the engagement of the backward traveling clutch.

Figure 26:
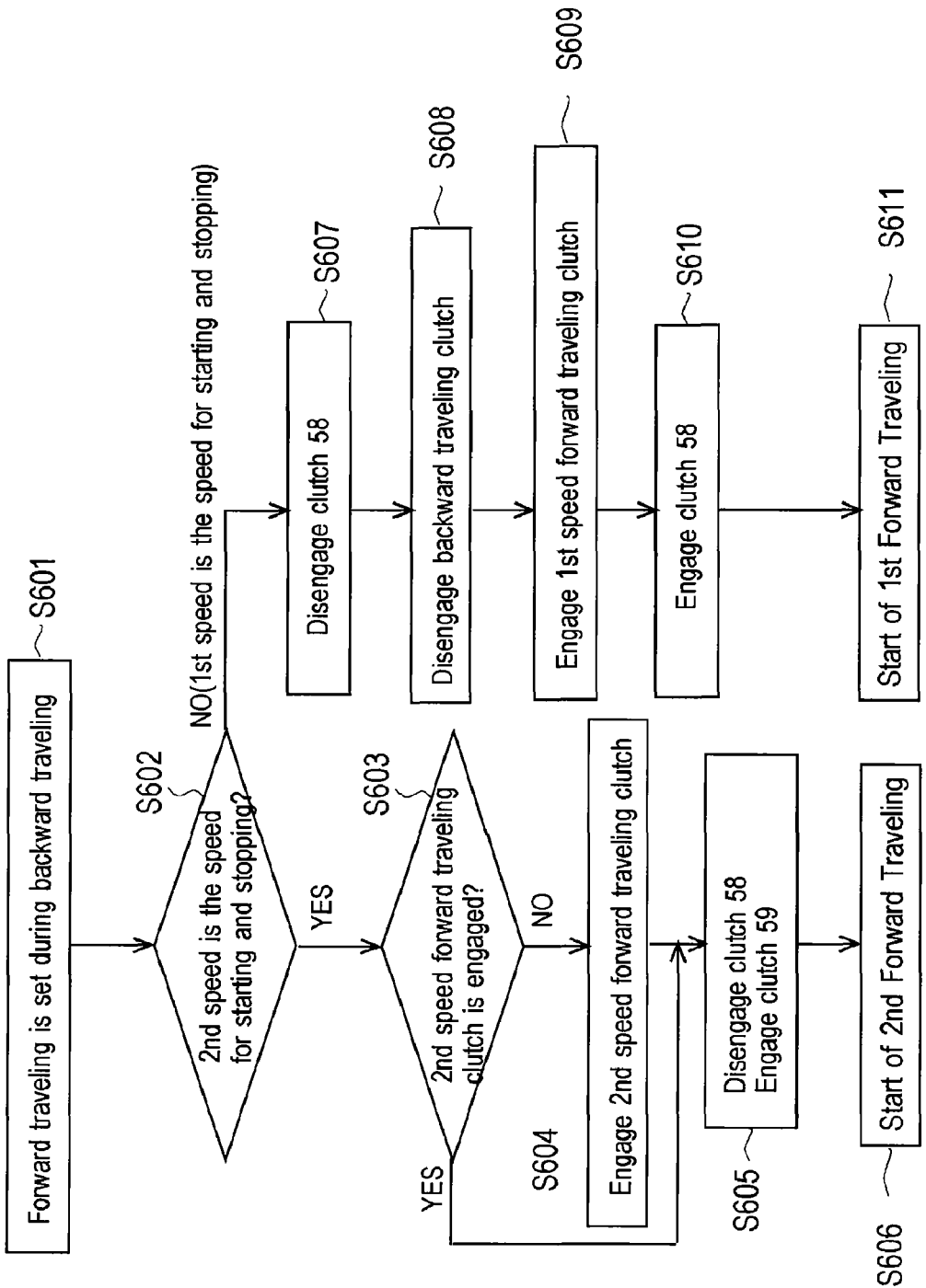
FIG. 26 is a flow chart of gearshift of the dual clutch transmission when setting for forward traveling during backward traveling of the vehicle.

Referring to a flow chart of FIG. 26, description will be given of the gearshift (clutch shift process) when reverser lever 236a is shifted to backward traveling position 240 during backward traveling of vehicle 1, i.e., the forward traveling is set during backward traveling of vehicle 1 (step S601). In this case, if the second speed is defined as the starting-and-stopping stage because the on-road traveling mode or the load-control traveling mode is set (step S602, YES), controller 90 judges whether the second speed forward traveling clutch is engaged or not (step S603). If the disengagement of the second speed forward traveling clutch is found, the second speed forward traveling clutch is engaged (step S604). Then, the process for disengaging first clutch 58 and engaging second clutch 59 is performed (step S605), thereby starting the second speed traveling of vehicle 1 (step S606). When the second speed forward traveling clutch has been engaged at the time when the forward traveling is set during backward traveling (step S602, NO), the process for engaging the second speed forward traveling clutch (step S604) can be omitted, i.e., the process for disengaging first clutch 58 and engaging second clutch 59 (step S605) can be started immediately. From this viewpoint, if the second speed is the starting-and-stopping speed, and the engagement of the second speed forward traveling clutch (the selection of the second speed forward traveling gear train to be driven) is kept during backward traveling of vehicle 1, vehicle 1 can start for the second speed traveling without delay after the setting of forward traveling during backward traveling. For the same reason, the backward traveling clutch may be engaged during the second speed forward traveling of vehicle 1.

When the first speed is defined as the starting-and-stopping speed (step S602, NO), both the first and second clutches 58 and 59 must be completely disengaged before the first speed forward gear train replaces the backward traveling gear train so as to be driven, similar to the gearshift from the first speed forward traveling to the backward traveling. Therefore, first clutch 58 is disengaged while second clutch 59 has been disengaged (step S607), then, the backward traveling clutch is disengaged (step S608), subsequently, the first speed forward traveling clutch is engaged (step S609), and first clutch 58 is engaged (step S610), thereby starting vehicle 1 for the first speed traveling (step S611).

Description will now be given of a neutral control set by shifting reverser lever 236a to neutral position 239 during forward or backward traveling of vehicle 1. This case is not regarded as the above-mentioned cases where lever 236a momentarily passes neutral position 239 while its shift between forward traveling position 238 and backward traveling position 240 during traveling of vehicle 1.

Various different patterns are suggested as the speed control when shifting reverser lever 236a to neutral position 239 because it depends on what situation is anticipated to occur after the neutral state. For example, if the operation of reverser lever 236a is intended chiefly for reversing the forward/backward traveling direction, i.e., if neutral position 239 is almost the temporary rest point of reverser lever 236a on the way of its movement between forward position 238 and backward position 240, it is suggested that dual clutch transmission 19 is gearshifted to be ready for the backward traveling start of vehicle 1 when reverser lever 236a is shifted to neutral position 239 during forward traveling of vehicle 1, and that it is gearshifted to be ready for the forward traveling start of vehicle 1 when reverser lever 236a is shifted to neutral position 239 during backward traveling of vehicle 1.

Figure 27:
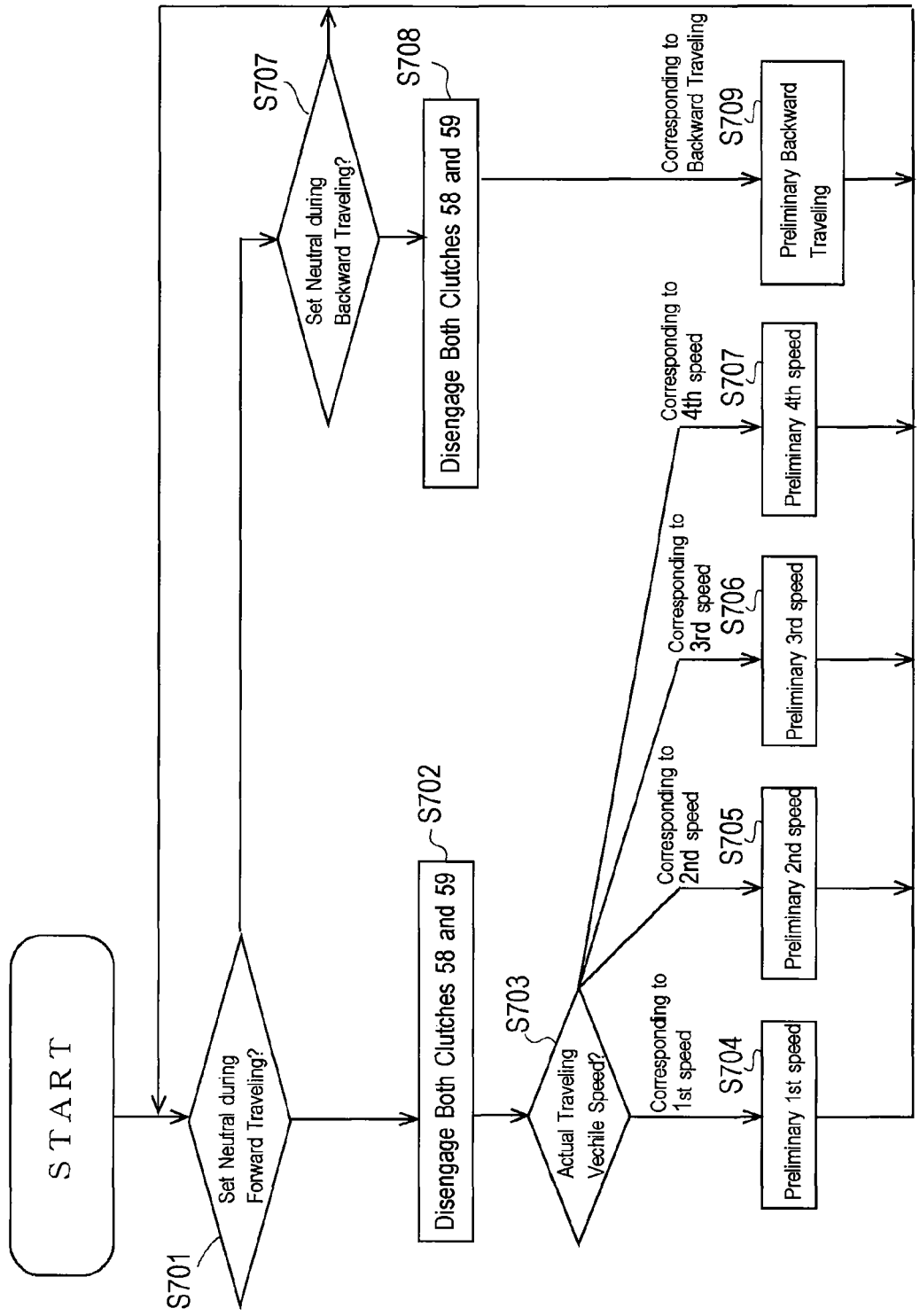
FIG. 27 is a flow chart of gearshift of the dual clutch transmission when setting the vehicle into a neutral state during traveling of the vehicle.

The neutral control shown in FIG. 27 is intended for "re-driving", i.e., the returning of driving of dual clutch transmission 19 for forward traveling after shifting of reverser lever 236a to neutral position 239 during forward traveling of vehicle 1, and the returning of driving of dual clutch transmission 19 for backward traveling after shifting of reverser lever 236a to neutral position 239 during backward traveling of vehicle 1. At first, when lever 236a is shifted to neutral position 239 during either forward or backward traveling of vehicle 1 (step S701 or S707), both first and second clutches 58 and 59 are disengaged (step S702 or S708). After the disengagement of both clutches 58 and 59, if vehicle 1 travels forward, the actual vehicle traveling speed is detected (step S703). The actual vehicle traveling speed is compared with map 171, for example, so that controller 90 decides what speed of dual clutch transmission 19 for forward traveling corresponds to the actual vehicle traveling speed, and selects the decided speed gear train to be driven.

If the first speed is decided to correspond to the actual vehicle traveling speed, the first speed forward traveling clutch is engaged, i.e., the preliminary first speed state is set (step S704). Similarly, if the second speed is decided to correspond to the actual vehicle traveling speed, the second speed forward traveling clutch is engaged, i.e., the preliminary second speed state is set (step S705). If the third speed is decided to correspond to the actual vehicle traveling speed, the third speed forward traveling clutch is engaged, i.e., the preliminary third speed state is set (step S706). If the fourth speed is decided to correspond to the actual vehicle traveling speed, the fourth speed forward traveling clutch is engaged, i.e., the preliminary fourth speed state is set (step S707). After one of these preliminary states is set, one of first and second clutches 58 and 59 is engaged, thereby immediately resetting the speed corresponding to the actual vehicle traveling speed, and thereby preventing a sudden rapid speed change on re-driving of vehicle 1.

On the other hand, when lever 236a is shifted to neutral position 239 during backward traveling of vehicle 1, after the disengagement of both clutches 58 and 59, the backward traveling clutch is engaged, i.e., the preliminary backward traveling state is set (step S709). After this setting, first clutch 58 is controlled to be engaged as soon as lever 236a returns to backward traveling position 240, thereby immediately starting vehicle 1 for backward traveling.

It is further understood by those skilled in the art that the foregoing description is a preferred embodiment of the disclosed apparatus and that various changes and modifications may be made in the invention without departing from the scope thereof defined by the following claims.

What is claimed is:

1. A dual clutch transmission comprising:
   at least one drive train of odd-numbered speed, including at least a drive train of a first speed serving as the lowest speed;
   a first clutch to be engaged for driving the drive train of the first speed or another odd-numbered speed;
   at least one drive train of even-numbered speed or speeds, including at least a drive train of a second speed serving as the second lowest speed;
   a second clutch to be engaged for driving the drive train of the second speed or another even-numbered speed;
   an automatic speed control system for selecting one of the drive trains, and for selecting either the first or second clutch to be engaged for driving the selected drive train, in correspondence to at least an actual traveling speed of a vehicle equipped with the dual clutch transmission; and
   a selection means for selecting either the first speed or any speed other than the first speed to be selected for starting and stopping of the vehicle.

2. The dual clutch transmission according to claim 1, wherein a load on an engine of the vehicle during traveling is detected, and wherein, when the detected load exceeds a threshold, the selection means automatically selects the first speed, and otherwise, the selection means automatically selects any speed other than the first speed.

3. The dual clutch transmission according to claim 2, wherein the load on the engine of the vehicle during traveling is defined as a relation of a detection value of engine rotary speed to a detection value of accelerator position.

4. The dual clutch transmission according to claim 1, wherein a tilt angle of the vehicle is detected, and wherein, when the detected tilt angle exceeds a threshold, the selection means automatically selects the first speed, and otherwise, the selection means automatically selects any speed other than the first speed.

5. The dual clutch transmission according to claim 1, wherein the automatic speed control system can skip driving of a drive train or drive trains of one or more speeds when shifting from one speed to another speed.

* * * * *